United States Patent
Crisp

(10) Patent No.: US 9,063,761 B2
(45) Date of Patent: Jun. 23, 2015

(54) APPARATUS AND METHOD FOR MULTI-ASPECT SIMULATION

(75) Inventor: Martin Joseph Michael Crisp, Toronto (CA)

(73) Assignee: BLUEPRINT SOFTWARE SYSTEMS INC., Toronto (CA)

(*) Notice: Subject to any disclaimer, the term of this patent is extended or adjusted under 35 U.S.C. 154(b) by 549 days.

(21) Appl. No.: 13/370,711

(22) Filed: Feb. 10, 2012

(65) Prior Publication Data

US 2012/0210295 A1 Aug. 16, 2012

Related U.S. Application Data

(60) Provisional application No. 61/441,869, filed on Feb. 11, 2011.

(51) Int. Cl.
*G06F 9/44* (2006.01)
*G06F 9/455* (2006.01)

(52) U.S. Cl.
CPC . *G06F 9/455* (2013.01); *G06F 8/10* (2013.01)

(58) Field of Classification Search
USPC .................................................. 717/105, 123
See application file for complete search history.

(56) References Cited

U.S. PATENT DOCUMENTS

| | | | |
|---|---|---|---|
| 5,649,180 A | 7/1997 | Danno et al. | |
| 7,457,798 B2* | 11/2008 | Capps ................................... | 1/1 |
| 7,640,251 B2 | 12/2009 | Sundararajan et al. | |
| 7,644,390 B2 | 1/2010 | Khodabandehloo et al. | |
| 8,352,934 B1 | 1/2013 | Borole et al. | |
| 2003/0023953 A1* | 1/2003 | Lucassen et al. ............. | 717/106 |
| 2004/0078817 A1 | 4/2004 | Horowitz et al. | |
| 2005/0015743 A1 | 1/2005 | O'Brien | |
| 2006/0174222 A1 | 8/2006 | Thonse et al. | |
| 2006/0212848 A1 | 9/2006 | Kasubuchi et al. | |
| 2007/0016887 A1 | 1/2007 | Kaler et al. | |
| 2007/0143834 A1 | 6/2007 | Leinonen et al. | |
| 2007/0162522 A1 | 7/2007 | Sengupta et al. | |
| 2008/0189313 A1 | 8/2008 | Heinkel et al. | |
| 2012/0166921 A1* | 6/2012 | Alexandrov et al. ......... | 715/202 |

FOREIGN PATENT DOCUMENTS

EP 1205841 A1 5/2002

OTHER PUBLICATIONS (web article: Blueprint Announces Blueprint Requirements Center 2010; dated Jun. 15, 2009, URL:http://www.blueprintsys.com/news/blueprint_announces_blueprint_requirements_center_2010; retrieved on Jun. 24, 2014).*
Related PCT International Application No. PCT/CA2012/000123 International Search Report dated Jun. 4, 2012.

(Continued)

*Primary Examiner* — Hang Pan
(74) *Attorney, Agent, or Firm* — Perry + Currier Inc.; Kristjan Spence

(57) ABSTRACT

A multi aspect simulation apparatus, method and system is provided, which can be used in the process of developing a software specification to be used by software programmers to code or revise a piece of software. A plurality of descriptors for the software is received and a plurality of pointers between various descriptors is also received. The descriptors and pointers are integrated to infer further relationships between different descriptors. A simulation can then be created based on the descriptors, pointers and relationships.

19 Claims, 23 Drawing Sheets

(56) References Cited

OTHER PUBLICATIONS

Related PCT International Application No. PCT/CA2012/000123 Written Opinion of the International Searching Authority dated Jun. 4, 2012.

Corresponding PCT International Application No. PCT/CA2012/000122 International Search Search Report dated May 31, 2012.

Corresponding PCT International Application No. PCT/CA2012/000122 Written Opinion of the International Searching Authority dated May 31, 2012.

\* cited by examiner

APPARATUS AND METHOD FOR MULTI-ASPECT SIMULATION

FIELD

The present specification relates generally to computing and more specifically relates to an apparatus and method for multi-aspect simulation.

BACKGROUND

Even as computing technology increases its sophistication and reach across broader ranges of the population, in many circumstances the approaches to software development have not kept pace with the computing technology itself.

SUMMARY

A multi aspect simulation apparatus, method and system is provided, which can be used in the process of developing a software specification to be used by software programmers to code or revise a piece of software. A plurality of descriptors for the software is received and a plurality of pointers between various descriptors is also received. The descriptors can include, amongst other things, business process models and storyboards. The descriptors and pointers are integrated to infer further relationships between different descriptors. A simulation can then be created based on the descriptors, pointers and relationships.

DESCRIPTION

Figure 1:
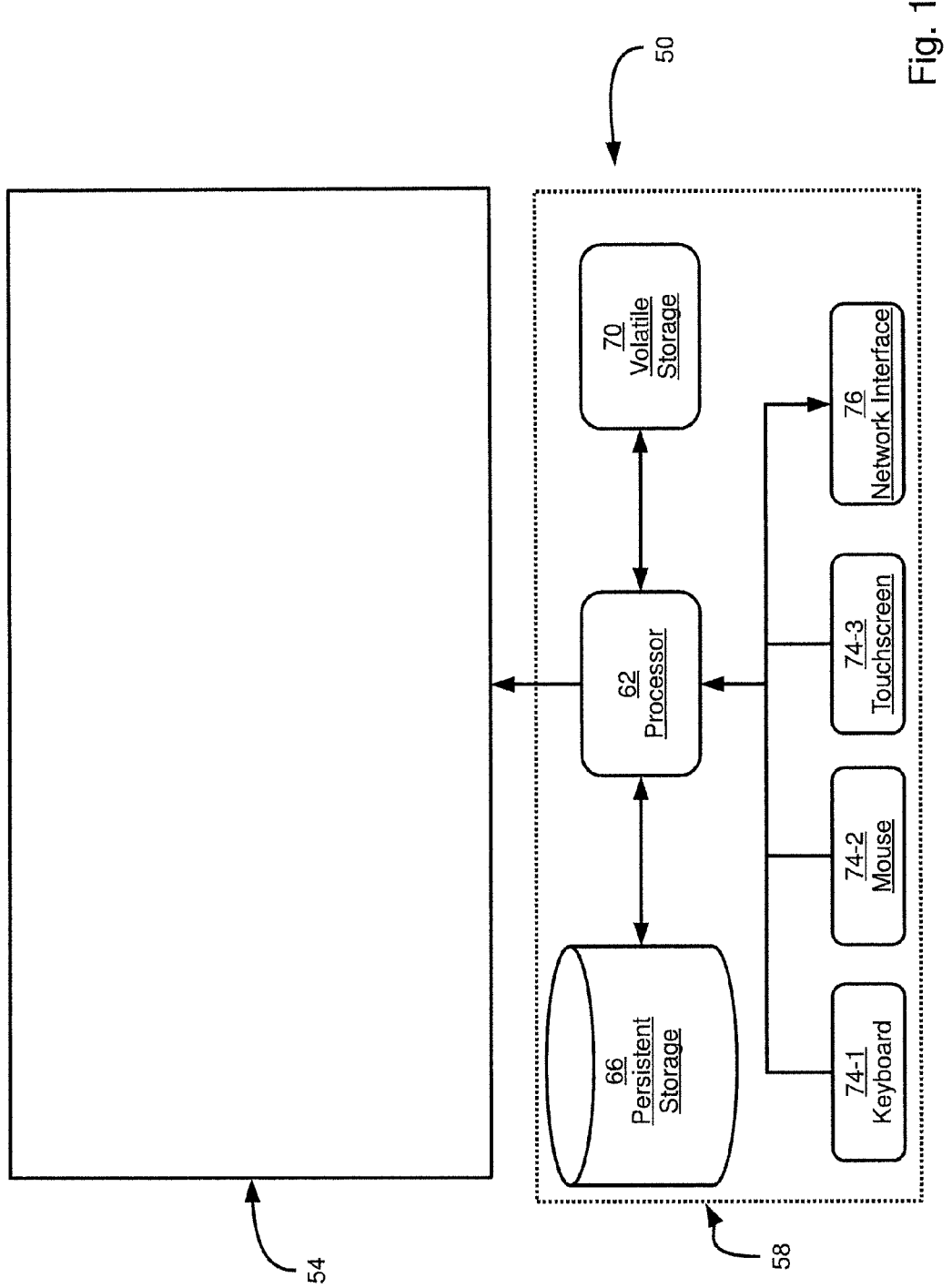
FIG. 1 shows a computing device for use in multi-aspect simulation.

Referring now to FIG. 1, a computing device for use in multi-aspect simulation is indicated generally at 50. In a present embodiment, computing device 50 comprises a display 54 and an apparatus 58 for controlling display 54. Computing device 50 can be implemented in a wide variety of platforms, including without limitation, desktop computers, laptop computers, tablet computers, notebook computers, or netbook computers.

It will be understood that the exact configuration of display 54 and apparatus 58 can vary according to the type of platform. Accordingly, display 54 can be implemented using any desired display technologies, including a liquid crystal display, an organic light emitting diode (OLED) display, a cathode ray tube or a projector. By the same token apparatus 58 can be implemented using any computing hardware structures that are capable of controlling display 54. A non-limiting, and simplified example of such a computing hardware structure for apparatus 58 is shown in FIG. 1 and comprises at least one processor 62 that is coupled to at least one persistent storage device 66, at least one volatile storage device 70, and at least one input device 74-1, 74-2, 74-3. (Collectively, input devices 74, and generically, input device 74). Processor 62 is also connected to at least one network interface 76 for connecting device 50 to a network such as the Internet or an intranet. It will now be apparent that persistent storage 66 and volatile storage 70 are examples of non-transitory computer readable storage media.

Processor 62 can be based on any known or future contemplated microprocessor(s), including those offered by Intel™, Advanced Microdevices™, Motorola™, or others. A plurality of processors 62 may be employed, or multiple core processors may be employed or combinations thereof. For example, it is common on a personal computer to have a central processing unit, as well as a separate microprocessor located on a video controller card. Such configurations, and variations thereon, are contemplated.

Persistent storage device 66 can comprise any type of persistent storage, including but not limited to one or more of a hard disc drive, an optical disc drive, FLASH, or a redundant array of inexpensive disks (RAID). Persistent storage device 66 can also be located remotely from processor 62, such as on a remote file server or web server, in which case the link between processor 62 and persistent storage device 66 can be based on the Internet or any other network topography. Again, the type of persistent storage device 66 will typically complement the platform of computing device 50. Volatile storage 70 can comprise random access memory (RAM) or the like.

Input devices 74, in the present example, comprise a keyboard 74-1, a mouse 74-2, and a touchscreen 74-3. It should be understood that only one or more input devices need be provided, and also that other types of input devices, not shown, such as touch pads, are contemplated. The links between input devices 74 and processor 62 can be wired or wireless. Referring specifically to keyboard 74-1, it should be understood that QWERTY or reduced keyboards are contemplated. In sum the configuration of apparatus 58 can vary and depend on the type of platform used to implement computing device 50.

Figure 2:
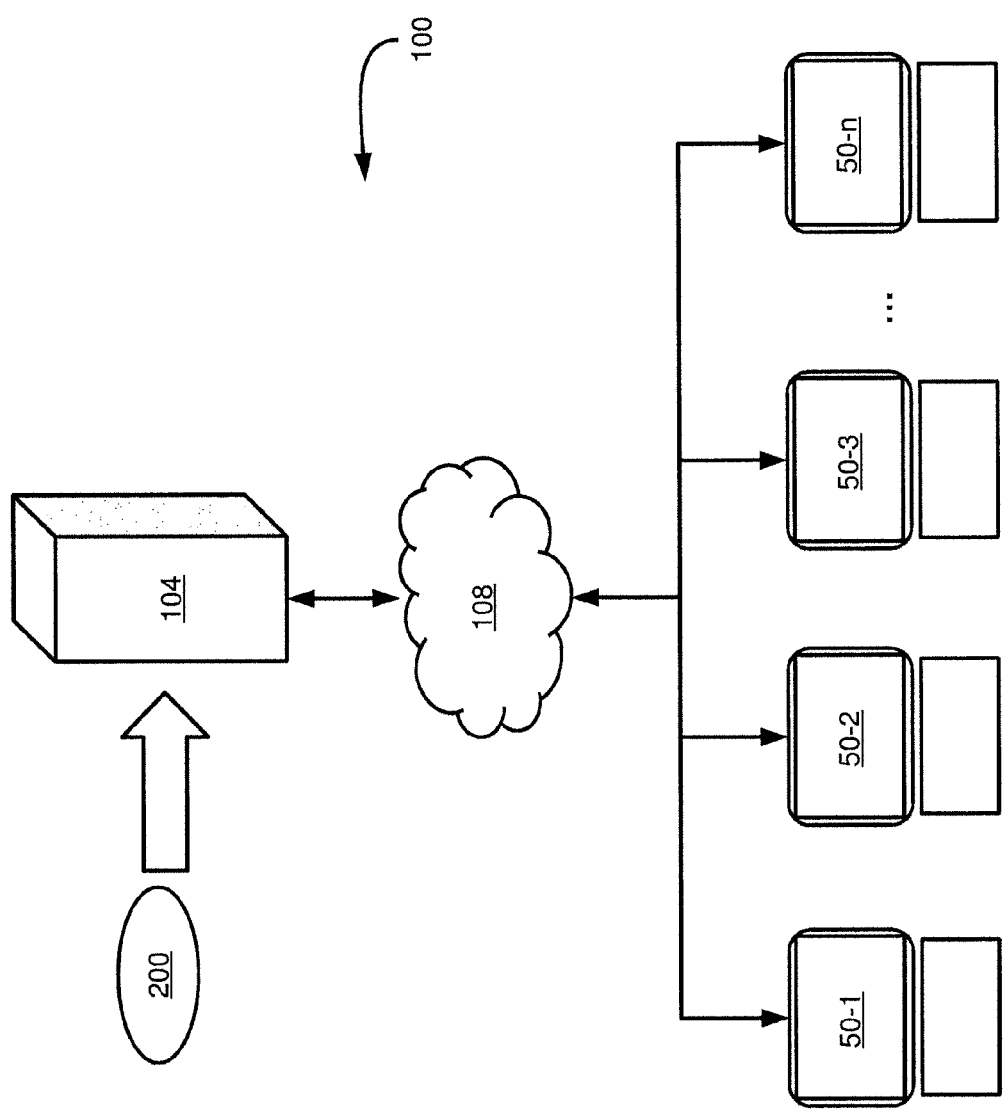
FIG. 2 shows a system for multi-aspect simulation.

Referring now to FIG. 2, a system for multi-aspect simulation is indicated generally at 100. System 100 comprises a plurality of computing devices 50 connected to a simulation server 104 via a network 108. As noted above, network 108 can be the Internet or an intranet, or combinations thereof. Server 104 can be based on any computing environment and those skilled in the art will now appreciate that such a computing environment may comprise a combination of one or more single or multi-core processors that interconnect persistent storage, volatile storage, network interfaces, and optionally keyboard, mouse and display. Those skilled in the art will also recognize that server 104 may be virtualized or mirrored or both as is increasingly common in the context of cloud-computing. Server 104 is configured to execute a multi-aspect simulation application 200, inputs for which can be provided via computing devices 50. Outputs from multi-aspect simulation application 200 can be generated on any one or more of computing devices 50. Simulation application 200 comprises a plurality of computer readable instructions executable by a processor for implementing the functionality discussed below.

Figure 3:
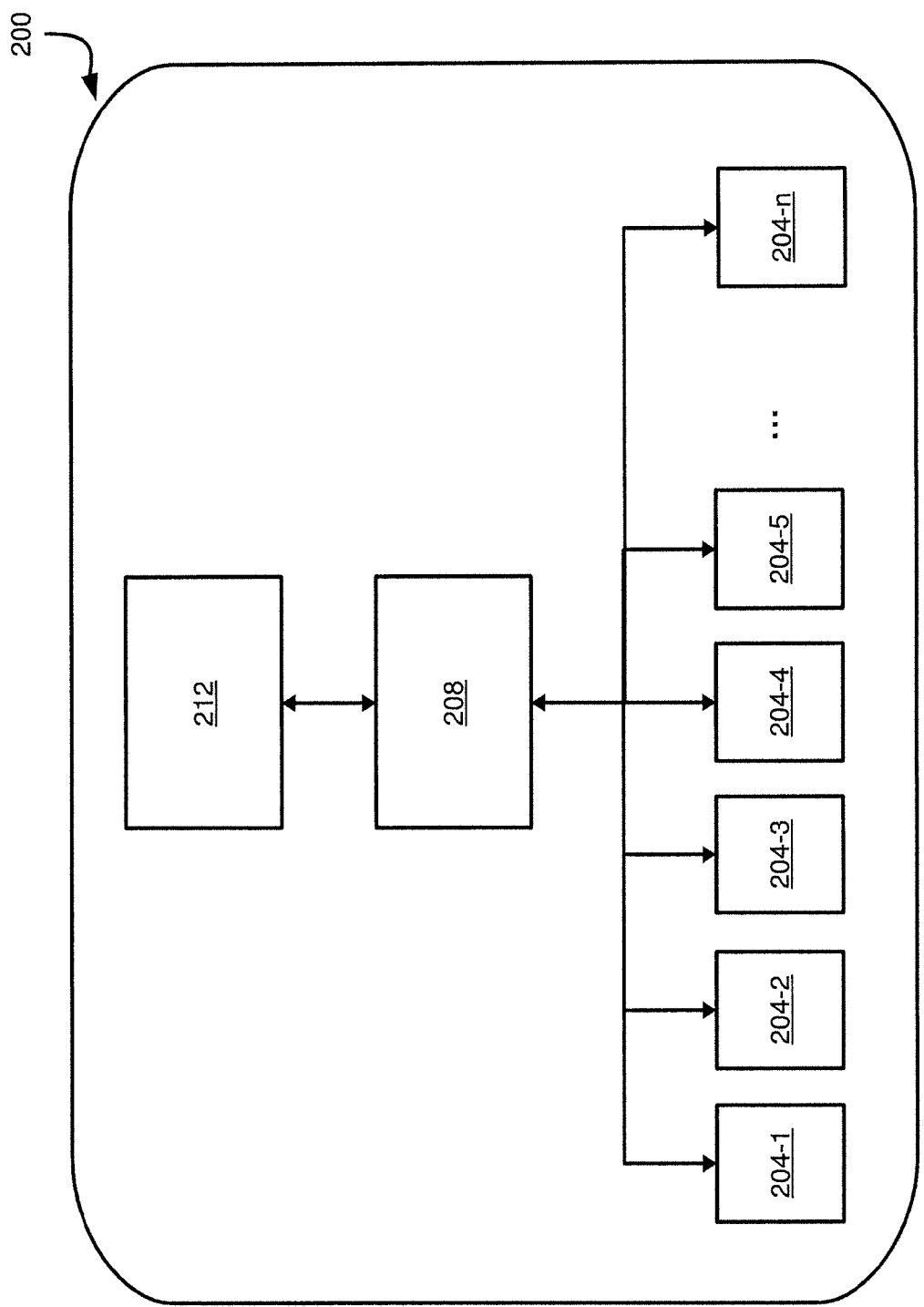
FIG. 3 shows the architecture of the multi-aspect simulation application of FIG. 2 in greater detail.

Referring now to FIG. 3, multi-aspect simulation application 200 is shown in greater detail. Application 200 thus comprises a plurality of descriptor interfaces 204, which provide input to an integration engine 208, which in turn provides input to a simulation engine 212. Each descriptor interface 204 hosts a unique interface for any computing device 50 that is authorized to access server 104. Each descriptor interface 204 is configured to receive a different type of descriptor input for use in a multi-aspect simulation. Integration engine 208 is configured to aggregate and manage correlations between different descriptors provided to each interface 204. Simulation engine 200 is configured to manage and generate an integrated simulation of all of the descriptor inputs received via interfaces 204.

The different types of interfaces 204 that are contemplated are discussed later in this specification in relation to Table I. However, at this point it is helpful to introduce FIG. 4, which comprises a method for multi-aspect simulation depicted in the form of a flow-chart and indicated generally at 300. Method 300 can be performed using system 100, but it should be understood that system 100 and method 300 can be varied. For example, the various blocks in method 300 need not necessarily be performed in the exact order shown, and various blocks in method 300 may be performed in parallel. However, for illustrative purposes the performance of method 300 will be explained below in relation to system 100.

Block 304 of method 300 comprises receiving descriptors. In the context of system 100, block 304 thus contemplates the reception of descriptor inputs via descriptor interfaces 204. Table I shows a non-limiting example list of presently contemplated types of unique descriptors that can be received via a respective interface 204. It is contemplated that other descriptor interfaces can also be provided for receiving other types of descriptions. For example, additional descriptor interfaces can be provided for receiving files (including textual and image files), state diagrams, and the like. The various interfaces listed in Table I will be discussed in greater detail below. It is contemplated that in some embodiments, interfaces 204-2 and 204-6 can be replaced by a single interface such as storyboard interface 204-14. That is, storyboard interface 204-14 can be configured to receive picture-boards and UI mockups, as well as other image and textual data.

TABLE I

| Descriptor Interface Name | Descriptor Interface Reference |
|---|---|
| Business Process Model | 204-1 |
| Picture-board | 204-2 |
| Use Cases | 204-3 |
| Functional Requirements | 204-4 |
| Data | 204-5 |
| User Interface Mockups | 204-6 |
| Technical Requirements | 204-7 |
| Actors | 204-8 |
| Business Rules | 204-9 |
| Data Operations | 204-10 |
| Documents | 204-11 |
| Reviewer Comments | 204-12 |
| Business Domain Information | 204-13 |
| Storyboard | 204-14 |

Business Process Model interface 204-1 is configured to receive business process model data that represent a process of an enterprise. The specific formats for receiving such data are not particularly limited, but a non-limiting example of such a format is based on the Business Process Modeling Notation ("BPMN") as promulgated by the Object Management Group, 140 Kendrick Street, Building A, Suite 300 Needham, Mass. 02494 USA, (http://www.omg.org), or a suitably modified variant of an activity diagram according to the unified modeling language (UML).

Figure 5:
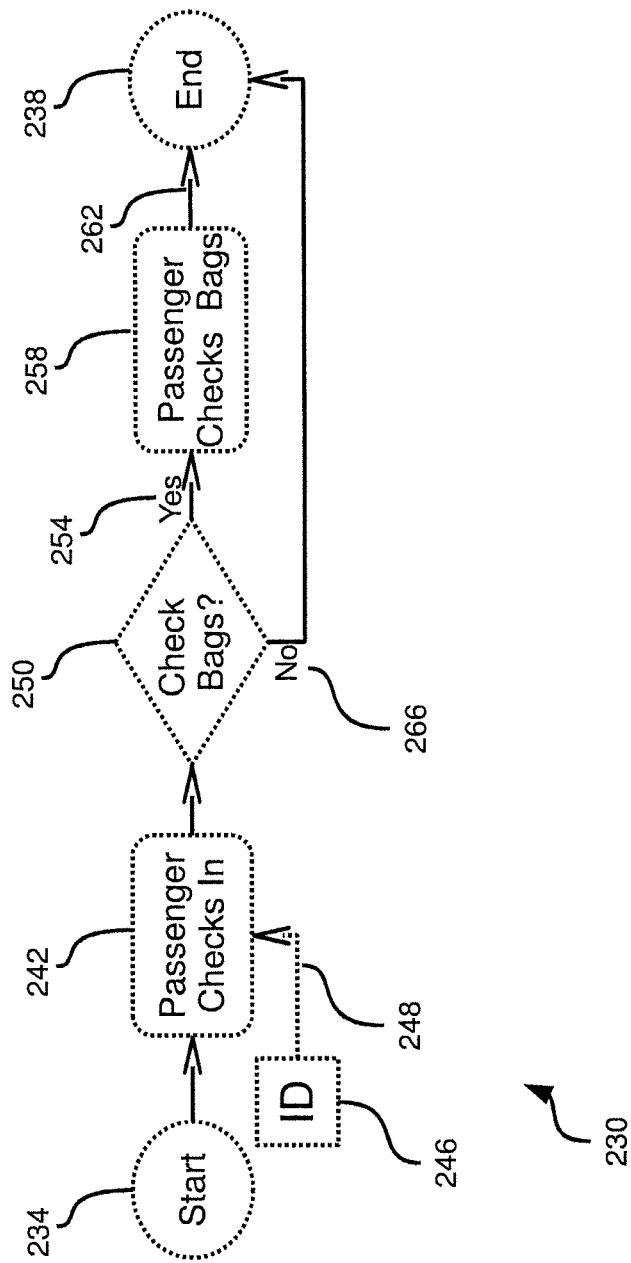
FIG. 5 shows an example business process model that can be received via one of the computing devices of FIG. 2.

FIG. 5 shows a non-limiting example business process model 230 that can be inputted at a computing device 50, sent over network 108 and received at Business Process Model interface 204-1 in fulfillment of block 304. The example business process model 230 of FIG. 5 will be referenced elsewhere herein, but it is to be emphasized that this is for non-limiting illustrative purposes only. Business process model 230 thus conforms to a defined graphical flowchart notation such as, for example, BPMN. Typically, business process model interface 204-1 is configured to recognize certain specific element types, so that received elements in business process model 230 can be subsequently processed by integration engine 208 and correlated with other elements from other types of descriptors received via other descriptor interfaces 204. Such correlation by integration engine 208 will be discussed in greater detail below in relation to the discussion of block 308 of method 300.

It should be noted that Business Process Model interface 204-1 can host a graphical interface that is accessible by a computing device 50, or the computing device 50 can locally host such an interface and then send meta-data to Business Process Model interface 204-1 representing business process model 230. In general it should now be understood that various server/client models for implementing system 100, whereby various structure and functions are either performed by server 104 or by a given computing device 50 as per a particular implementation. Indeed, in another variation, not shown, simulation application 200 runs entirely locally on a single computing device 50 thereby obviating the need for server 104 or any more than a single computing device 50. To that end, the reception of business process model 230 at Business Process Model interface 204-1 according to block 304 is represented in FIG. 6.

Referring again to FIG. 5, business process model 230 thus comprises a plurality of elements. As understood by those skilled in the art, where business process model 230 conforms with the BPMN, then such elements can comprise various: a) Flow Objects, including Events, Activities, Gateways; b) Connecting Objects including Sequence Flow, Message Flow, Association; c) Pools, including one or more individual swim lanes; d) Artifacts, including data objects, groups and annotations. The example business process model 230 of FIG. 5 is not intended to strictly conform with the BPMN per se, but is rather an illustrative example for use in this specification, on the understanding that the skilled reader will readily understand how business process model 230 can be structured to conform to the BPMN in an implementation of system 100.

Figure 4:
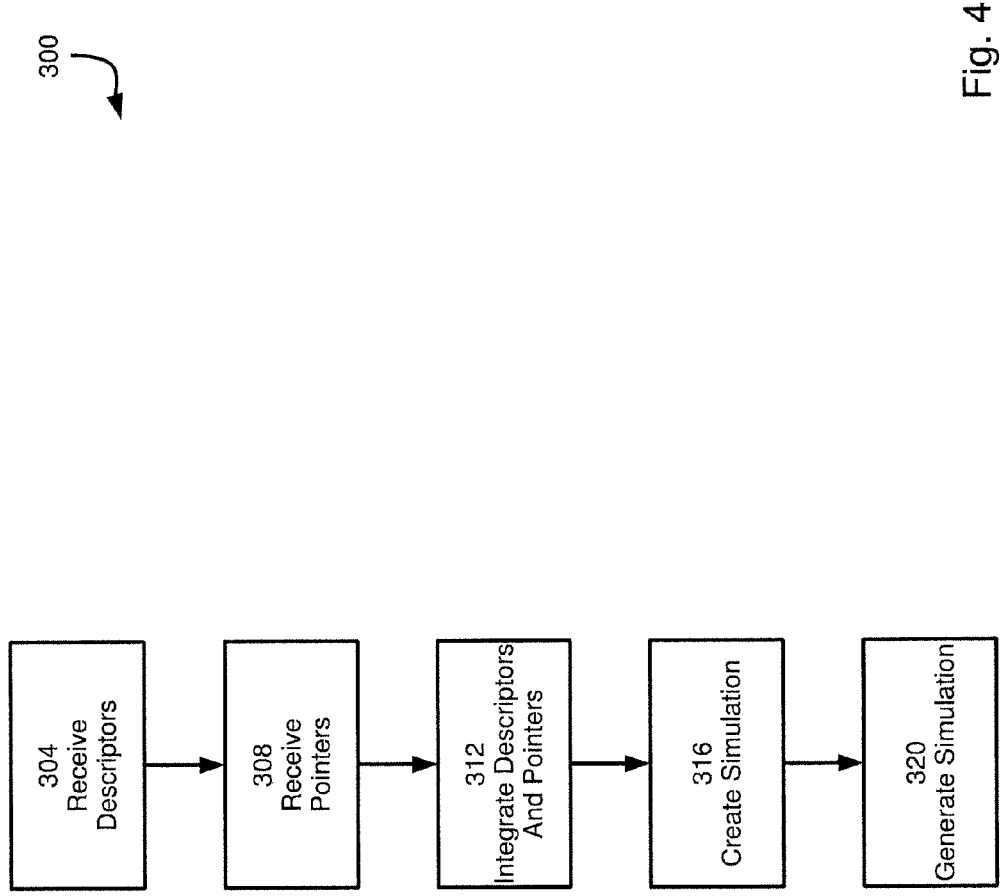
FIG. 4 shows a method for multi-aspect simulation.
Figure 6:
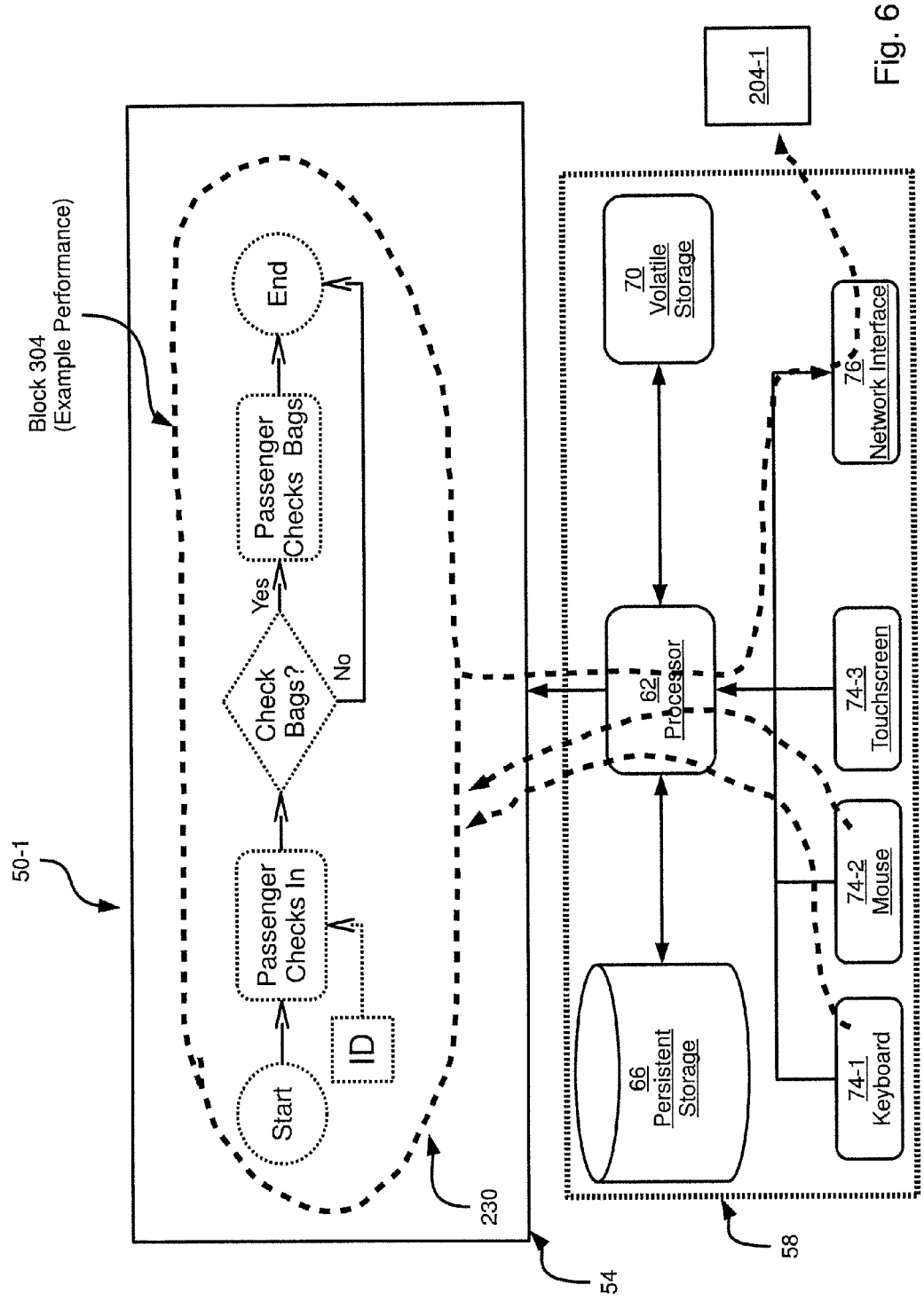
FIG. 6 shows an example of the business process model of FIG. 5 being received by the multi-aspect simulation application of FIG. 3.

At this point it is to be noted that business process model 230, as shown in the FIG. 5 and FIG. 6, uses hashed lines to denote individual elements, to distinguish business process model 230 from method embodiments of the present specification, (e.g. method 300 of FIG. 4). Such method embodiments utilize solid lines to denote individual blocks.

Referring again to FIG. 5, business process model 230 generally describes a passenger check-in sequence at an airport, where the passenger may or may not have baggage to be checked. Business process model 230 is bounded by a start element 234 and an end element 238. In BPMN, start element 234 is a start flow object event, while end element 238 is an end flow object event. After start element 234, a passenger check-in task element 242 is provided. Passenger check-in task element 242 generally corresponds with the activity of a passenger effecting their check-in to a particular airline, which typically includes the reception of identification credentials, from the passenger, a verification of the passenger's reservation, and the issuance of a boarding pass. In BPMN, passenger check-in task element 242 is a task activity flow object activity. An ID data object 246 is also provided in business process model 230 to reflect the fact that data in the form of identification credentials are an input to the passenger check-in. In BPMN, ID data object 246 connects to element 242 via a message flow connection 248.

Also as part of such a check-in at element 242, an indication is typically provided indicating the number of bags that the passenger wishes to check, rather than carry-on, to the aircraft. Accordingly, subsequent to element 242, a gateway element 250 is provided which determines the forking of paths according to conditions that are expressed. In BPMN, gateway element 250 is a gateway flow object element. The expressed condition in element 250 is whether or not the passenger has any bags to check.

The "Yes" sequence flow connector 254 joins to a passenger checks bags task element 258. In BPMN, passenger checks bags task element 258 is a task activity flow object activity, like element 242. The sequence flow connector 262 from element 258 leads to end element 238.

The "No" sequence flow connector 266 leads directly to end element 238 and bypasses element 258.

At this point it can be reiterated that business process model 230 is a simplified non-limiting example, and that it is contemplated that much more complex business models can be created using different types of elements in addition to or in lieu of that specifically discussed herein. In generally, any type of element contemplated by the BPMN or other notational specification is contemplated.

Referring again to FIG. 4, it should be noted that block 304 is repeated, or otherwise effected, for a plurality of the descriptor inputs that can be received via interfaces 204. Indeed, having discussed business process model interface 204, discussion will now turn to picture-board interface 204-2, which is configured to receive graphical picture-boards that also represent a process of an enterprise.

Figure 7:
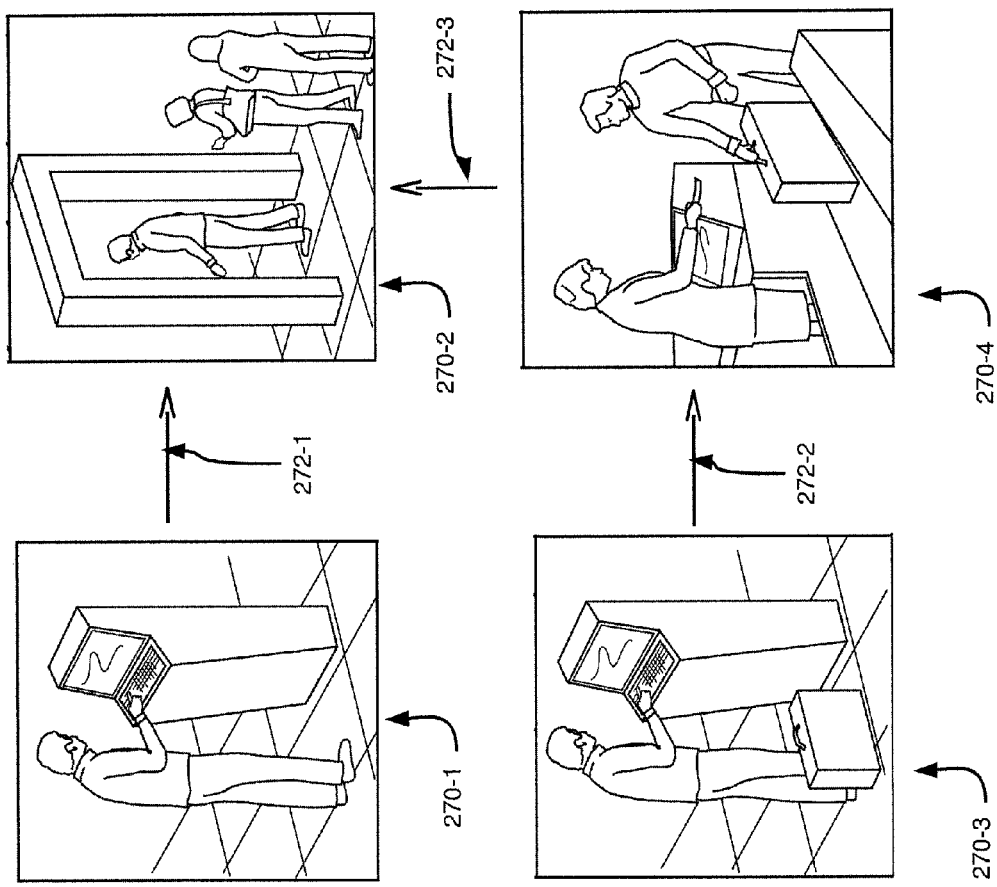
FIG. 7 shows an example set of picture-boards that can be received via one of the computing devices of FIG. 2.

The specific formats for picture-boards are not particularly limited, but typically contemplate a series of illustrations or images, in sequence, for the purpose of pre-visualizing a real-world interactive sequence of events. FIG. 7 shows an example set of picture-boards 270 comprising a plurality of picture-board illustrations that may be received by picture-board interface 204-2 which, as will be discussed further below, generally correspond to the example business process model 230 discussed above.

Figure 8:
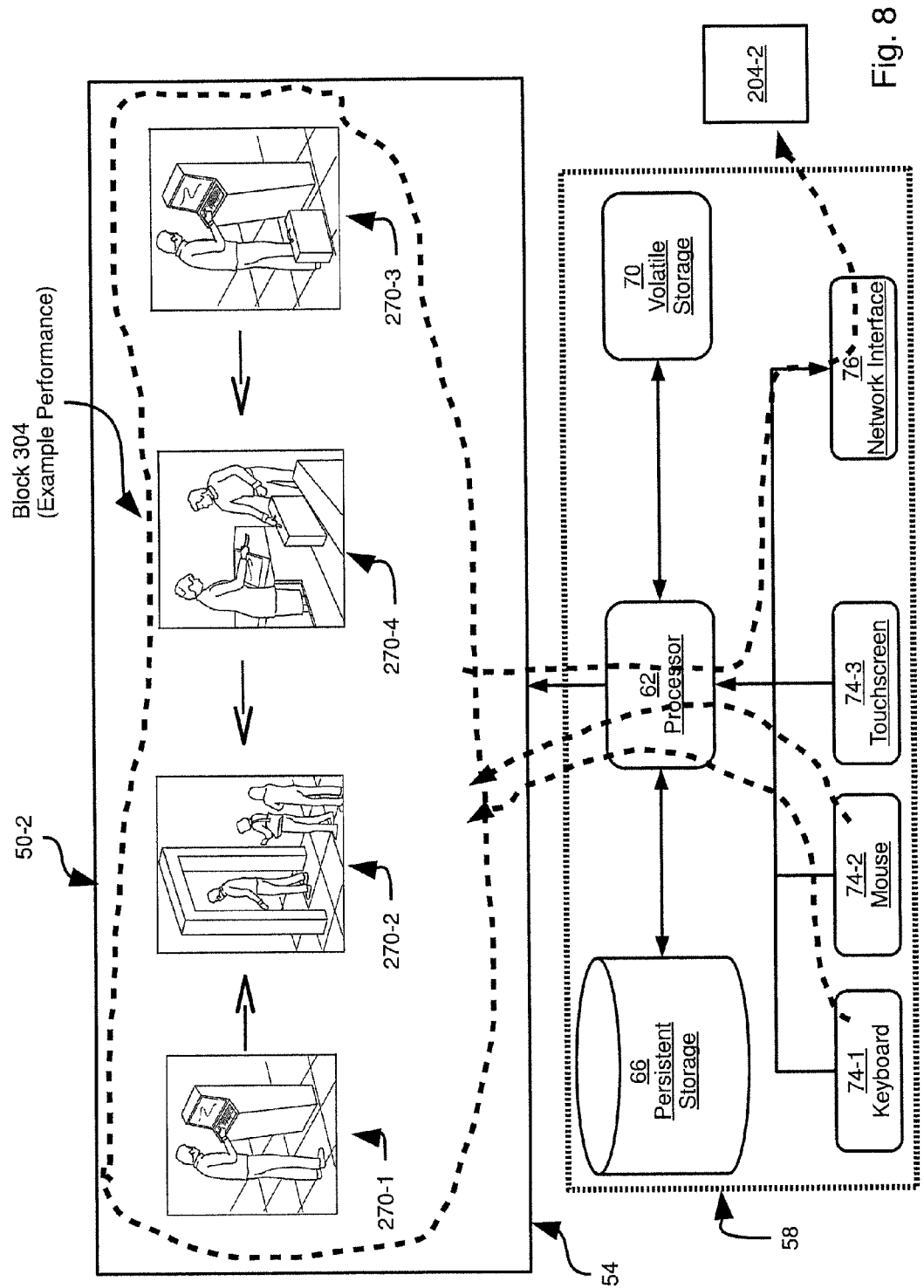
FIG. 8 shows an example of the picture-boards of FIG. 7 being received by the multi-aspect simulation application of FIG. 3.

FIG. 7 thus actually shows two possible picture-board sequences, with a total of four picture-boards 270. As noted earlier, storyboard interface 204-14 can receive data such as that shown in FIG. 7 in some embodiments (as well as UI mockups and other data). Thus, the picture-boards shown in FIG. 7 can also be referred to as storyboards. Picture-board 270-1 shows a passenger without luggage at an airline check-in kiosk. Picture-board 270-2, which follows picture-board 270-1, via a linkage 272-1, shows the passenger then heading through a security check towards the gate area of the airport. In contrast, picture-board 270-3 shows a passenger with luggage at an airline check-in kiosk. Picture-board 270-4, which follows picture-board 270-3, via a linkage 272-2, shows the passenger then checking the luggage in at a baggage check in counter. Picture-board 270-2, also follows picture-board 270-4 via linkage 272-3, and shows the passenger then heading through a security check towards the gate area of the airport. The reception of picture-boards 270 and linkages 272 at Business Process Model interface 204-2 according to block 304 is represented in FIG. 8.

At this point one of the advantages provided by this specification starts to become apparent. Software development is an exercise that is often undertaken without discipline, leading to poorly designed and implemented software with weak usability and poor functionality. This lack of discipline arises from the fact that the development of software typically requires the business group of an organization to effectively communicate organizational software needs to a software development group, and yet both groups usually have vastly differing skill sets, backgrounds, educations and communication methods and styles. Indeed, even these two branches of an organization typically comprise of a number of disparate sub-groups who themselves have differing skill sets, backgrounds, educations and communication methods and styles. The problem becomes even more acute when the software development group of the organization is actually one or more separate business entities that are under contract to actually develop the software.

While this problem exists for any size of organization, it becomes particularly acute the case for a large, decentralized organization that has hundreds or even thousands of employees dispersed across several geographic locations. An airline is but one non-limiting example of such an organization, but the software development needs of an airline do present a useful illustration for this specification.

Thus, returning to the specific example of business process model 230 and picture-boards 270, it can be noted that the development of a business process model 230 may be undertaken by business analysts who have little or no software programming capabilities, but are nonetheless skilled at creating and clearly defining repeatable and predictable business processes. By the same token, the development of picture-boards 270 may be undertaken by marketing or senior executives of an organization who have little experience in developing business process models and even less experience in software programming, but are nonetheless providing a leadership vision for customer experience.

Accordingly, one groups of the organization (e.g. the business analysts) may generate business process model 230, while the senior executive team generates the picture-boards 270. Likewise, the other descriptors contemplated in Table I may be generated by different groups or sub-groups of the organization.

Indeed, referring again to FIG. 4, it is again noted that block 304 is repeated, or otherwise effected, for a plurality of the descriptors input that can be received via interfaces 204. Indeed, discussion will now turn to use case descriptor interface 204-3, which is configured to receive use cases that reflect possible hardware and software programming behaviours that can be implemented to achieve various goals expressed in either business process model 230 or picture-boards 270 or other descriptors or a plurality of the descriptors. Again, the format in which a use case is received into use case descriptor interface 204-3 is not particularly limited. Presently contemplated formats include, without limitation, a text format listing a set of numbered steps or a more complex graphical model based on, for example, the unified modeling language (UML). Use cases can be formatted according to, for example, the teachings of A. Cockburn (2001), Writing Effective Use Cases, Boston, Mass., USA: Addison-Wesley Longman Publishing Co., Inc. ("Cockburn"), as cited in http://en.wikipedia.org/wiki/Use_case. Cockburn notes that a brief use case consists of a few sentences summarizing the use case. It can be easily inserted in a spreadsheet cell, and allows the other columns in the spreadsheet to record priority, duration, a method of estimating duration, technical complexity, release number, and so on. Cockburn also notes that a casual use case consists of a few paragraphs of text, summarizing the use case. Cockburn also notes that a fully dressed use case is a formal document based on a detailed template with fields for various sections; and it is the most common understanding of the meaning of a use case.

In a present embodiment use case descriptor interface 204-3 is configured to receive system use cases which automate all or part of a business process model such as business process model 230. Thus, in the present example, the concept of a system use case will be understood to refer how specific technology (i.e. technology actors) will behave in response to human (i.e. human actors) actions.

Figure 9:
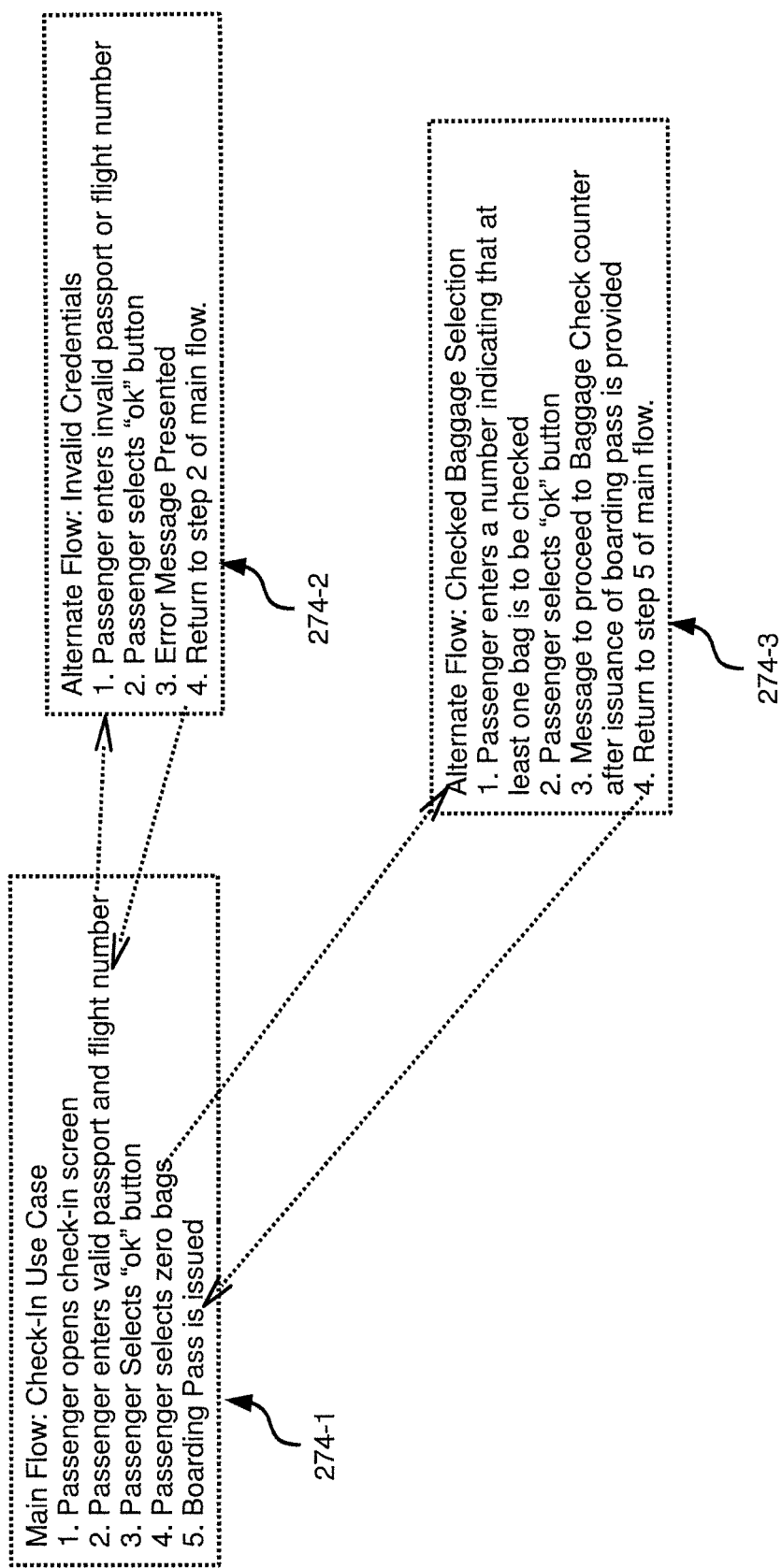
FIG. 9 shows an example set of use cases that can be received via one of the computing devices of FIG. 2.
Figure 10:
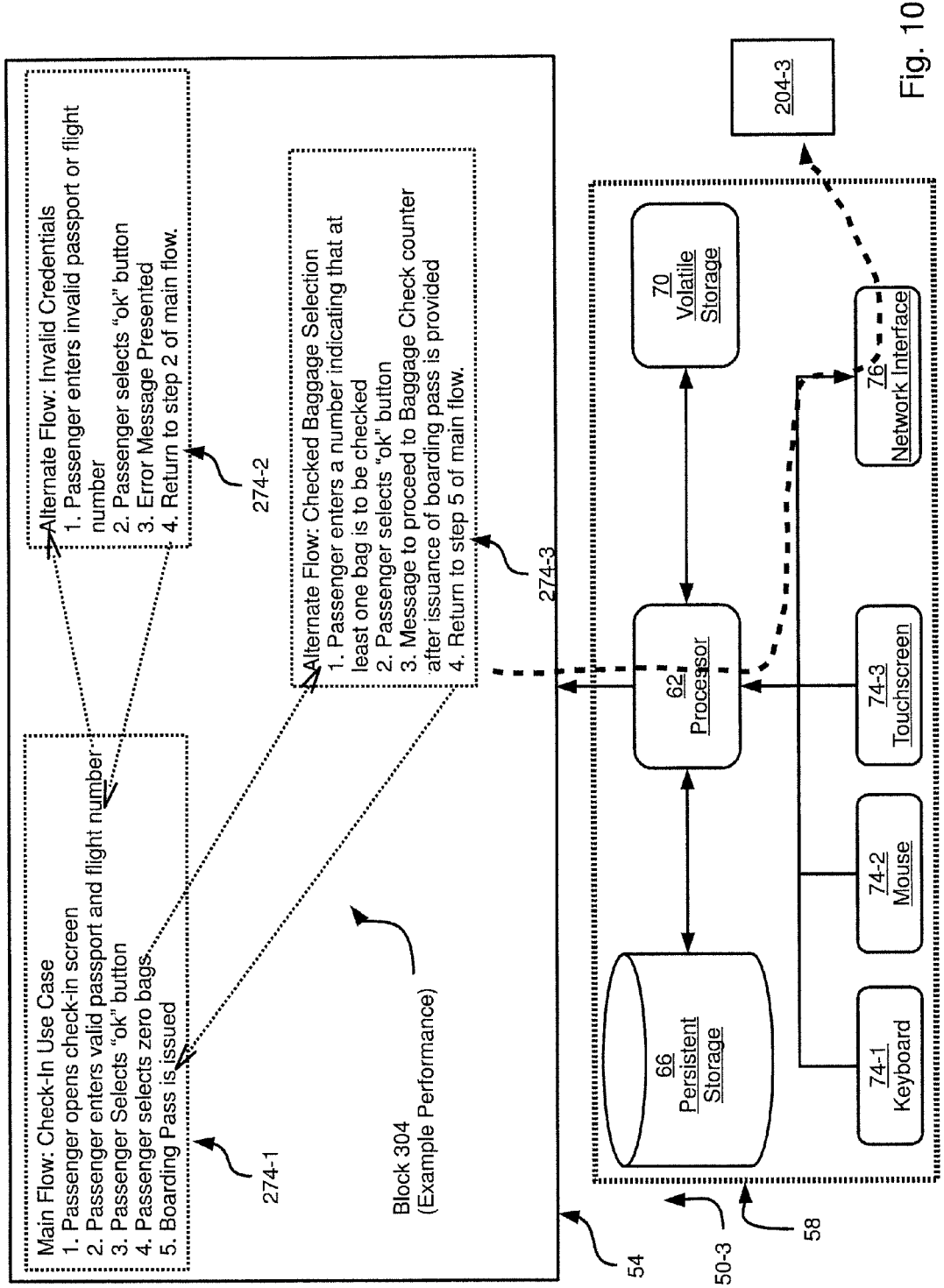
FIG. 10 shows an example of the use cases of FIG. 9 being received by the multi-aspect simulation application of FIG. 3.

FIG. 9 shows an illustrative but non-limiting example set of use cases 274 expressed in text as a brief use case consisting of a set of numbered steps. (As noted above, in other embodiments, other types of notations, formats or modeling are contemplated.)

Use case 274-1 represents a main flow with five steps, called "Main Flow: Check-in Use Case". The five steps of use case 274-1 are: 1. Passenger opens check-in screen; 2. Passenger enters valid passport and flight number; 3. Passenger Selects "ok" button; 4. Passenger selects zero bags to check in; 5. Boarding pass is issued.

Use case 274-2 represents a first alternative flow that may be invoked in relation to step 2 of the use case 274-1, called "Alternative Flow: Invalid Credentials", which is invoked in the event that the passenger enters invalid an passport or flight number combination. The four steps of use case 274-2 are: 1. Passenger enters invalid passport or flight number; 2. Passenger selects "ok" button; 3. Error message is presented indicating that invalid passport number or flight number entered; 4. Return to step two of the main flow.

Use case 274-3 represents a second alternative flow that may be invoked in relation to step 3 of the use case 274-3, called "Alternative Flow: Checked Baggage Selection", which is invoked in the event that the passenger indicates they have at least one bag to check. The four steps of use case 274-3 are: 1. Passenger enters a number indicating that there is at least one bag to be checked; 2. Passenger selects "ok" button; 3. Message is generated instructing the passenger to proceed to the baggage check-in counter after issuance of the boarding pass; 4. Return to step five of the main flow. The reception of use cases 274 at use case interface 204-3 according to block 304 is represented in FIG. 8.

Block 304 is thus repeated for any other descriptor interfaces 204 as desired. Table II provides exemplary details and definitions of what can be entered that is consistent with the business process model 230, picture-boards 270 and use case 274

TABLE II

| Descriptor Interface Name | Descriptor Interface Reference | Descriptor Interface Explanation | Example (If any) |
| --- | --- | --- | --- |
| Business Process Model | 204-1 | Discussed Above | See Business Case Model 230 in FIG. 5 |
| Picture-board | 204-2 | Discussed Above | See Picture-boards 270 of FIG. 7 |
| Use Cases | 204-3 | Discussed Above | See Use Cases 274 of FIG. 9 |
| Functional Requirements | 204-4 | A function of a software system or its component. A function is described as a set of inputs, the behavior, and outputs (see also software). Functional requirements may be calculations, technical details, data manipulation and processing and other specific functionality that define what a system is supposed to accomplish. | Passport must follow LL-NNNNNN Format. Flight Number must follow LL-NNN format. (L = Letters; N = Numbers) |

TABLE II-continued

| Descriptor Interface Name | Descriptor Interface Reference | Descriptor Interface Explanation | Example (If any) |
|---|---|---|---|
| Data | 204-5 | Any specific data | |
| User Interface Mockups | 204-6 | Example artwork for screen shots that correspond with various steps in a use case. | See subsequent Figures |
| Technical Requirements | 204-7 | Computing environment(s) necessary to implement the system | 1. An airline check in kiosk with a printer; 2. A desktop computer and printer co-located with a baggage check-in counter |
| Actors | 204-8 | Computing and human entities that interact with the system | 1. All components in system 100 2. The passenger 3. The Airline representative handling baggage check-in 4. The items listed under technical requirements. |
| Business Rules | 204-9 | More generalized business rules that govern the behaviour of the system | A maximum of two bags may be checked. |
| Data Operations | 204-10 | Any operations on the data | |
| Documents | 204-11 | Any documents | |
| Reviewer Comments | 204-12 | Data fields that are made available in association with all other data fields in application 200 to provide individual commentary. | |
| Business Domain Information | 204-13 | Data elements and structures particular to the organization. | 1. Airline name 2. Airline flight numbers 3. Flight times, origins and destinations. 4. Relationships between flight numbers, times, origins and destinations. 5. Passenger names 6. Passenger Passport Numbers 7. Relationships between each passenger name and flight numbers. |
| Storyboards | 204-14 | Sequencing of user-interface mockups | Comprises user interface mockups and connectors between various user interface mockups to convey same information as use cases. |
| System Description | 204-15 | Identification and interconnections between various hardware components | 1. A computerized kiosk for airline self check-in 2. A computer terminal for a baggage check-in desk attendant |

Referring again to FIG. 4, block 308 comprises receiving pointers. The pointers identify relationships between the various descriptors received at block 304. In application 200, the pointers are maintained by integration engine 208. Any one or more of computing devices 50 can be used to interact with integration engine 208 to establish relationships between various descriptors. The relationships can be established in conjunction with the actual provision of the descriptors once at least one descriptor has been provided. The term "pointers" as used herein refers not to references to memory addresses (as the term can be used in computer programming), but refers instead to data defining relationships between descriptors, as discussed below.

Figure 11:
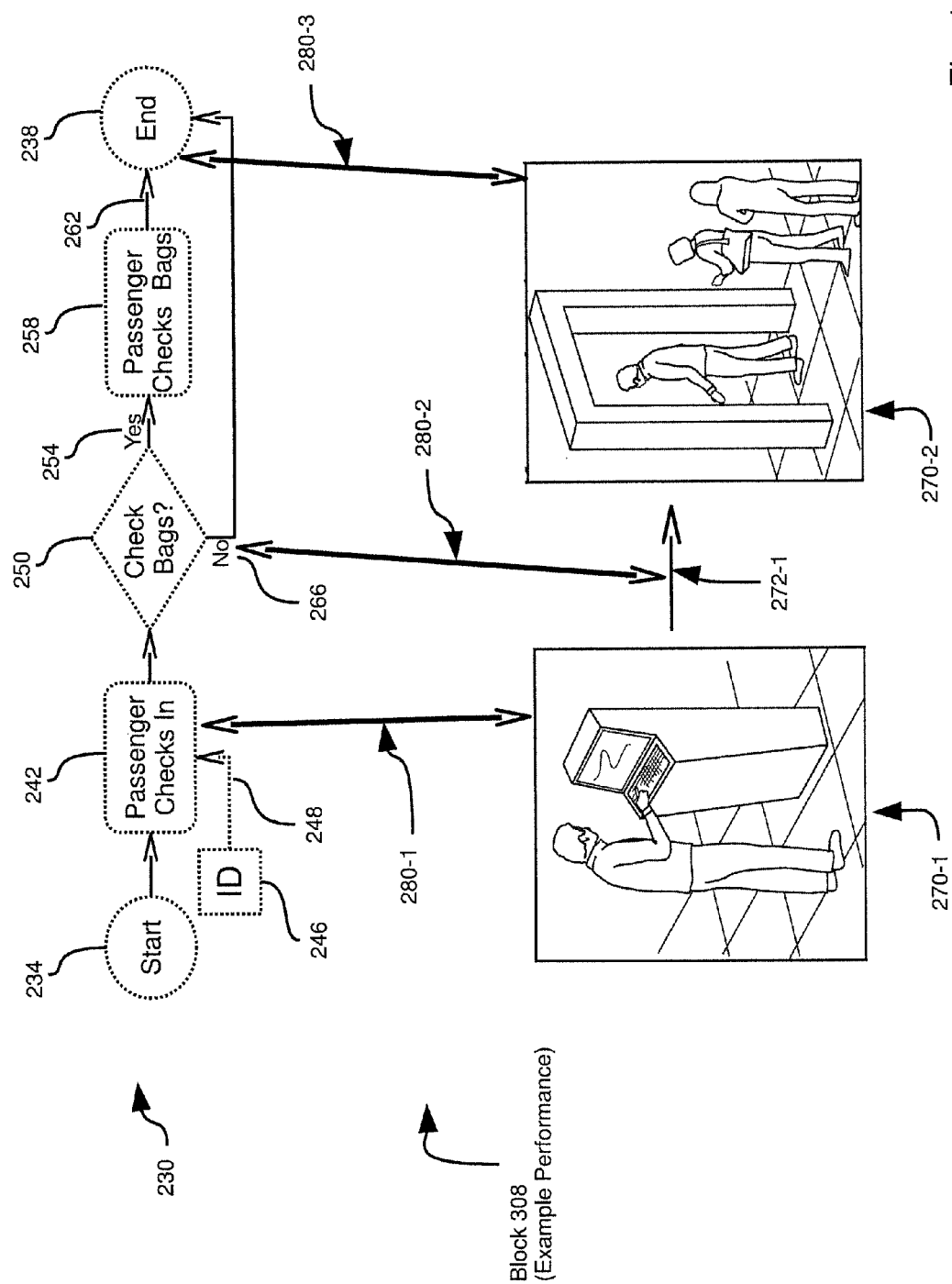
FIG. 11 shows an example of pointing relationships being established between the elements of the business process model of FIG. 5 and certain picture-boards of FIG. 7.

FIG. 11 shows a graphical representation of pointing relationships that may be received at block 308 which build on the specific examples given above. In FIG. 11, pointing relationships between business process model 230 and picture-board 270-1 and picture-board 270-2 are established. In FIG. 11, picture-board 270-1 shows a passenger without baggage using a kiosk to check in. A first pointing relationship 280-1 is therefore established between picture-board 270-1 and passenger check-in task element 242. A second pointing relationship 280-2 is also established between linkage 272-1 and the "No" sequence flow connector 266 emanating from gateway element 250. A third pointing relationship is also established between picture-board 270-2 and end element 238.

Figure 12:
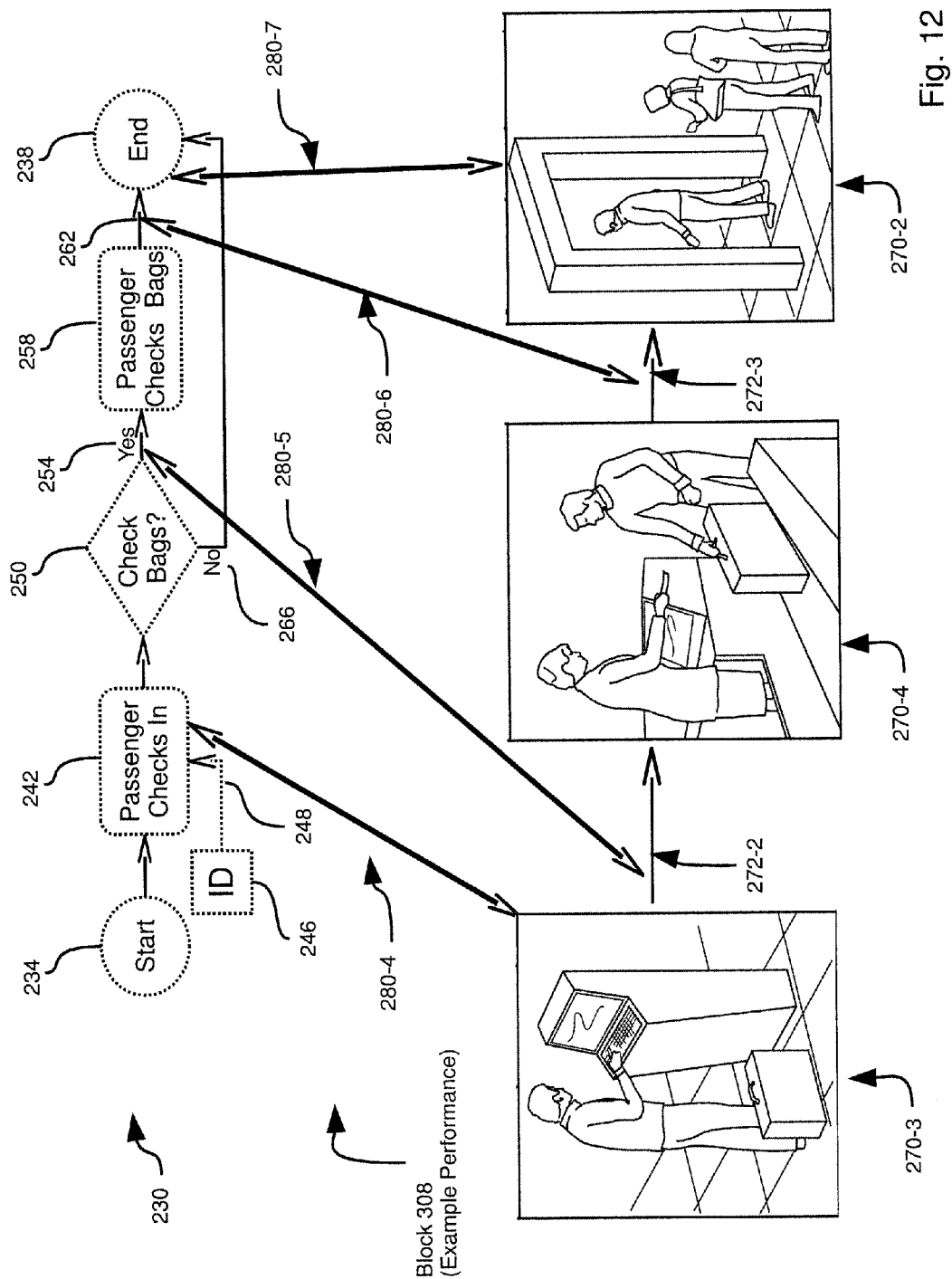
FIG. 12 shows another example of pointing relationships being established between the elements of the business process model of FIG. 5 and certain other picture-boards of FIG. 7.

FIG. 12 shows another graphical representation of additional pointing relationships that may be received at block 308 which build on the specific examples given above. In FIG. 12, pointing relationships between business process model 230 and picture-board 270-2, picture-board 270-3 and picture-board 270-4 are established. In FIG. 12, picture-board 270-3 shows a passenger with baggage using the kiosk to check in. A fourth pointing relationship 280-4 is therefore established between picture-board 270-3 and passenger check-in task element 242. A fifth pointing relationship 280-5 is also established between linkage 272-2 and the "Yes" sequence flow connector 254 emanating from gateway element 250. A sixth pointing relationship 280-6 is also established between linkage 272-3 and sequence flow connector 262. A seventh pointing relationship 280-7 is established between picture-board 270-2 and end element 238. (Alternatively, pointing relationship 280-7 may be obviated in favour of reusing pointing relationship 280-3.)

Figure 13:
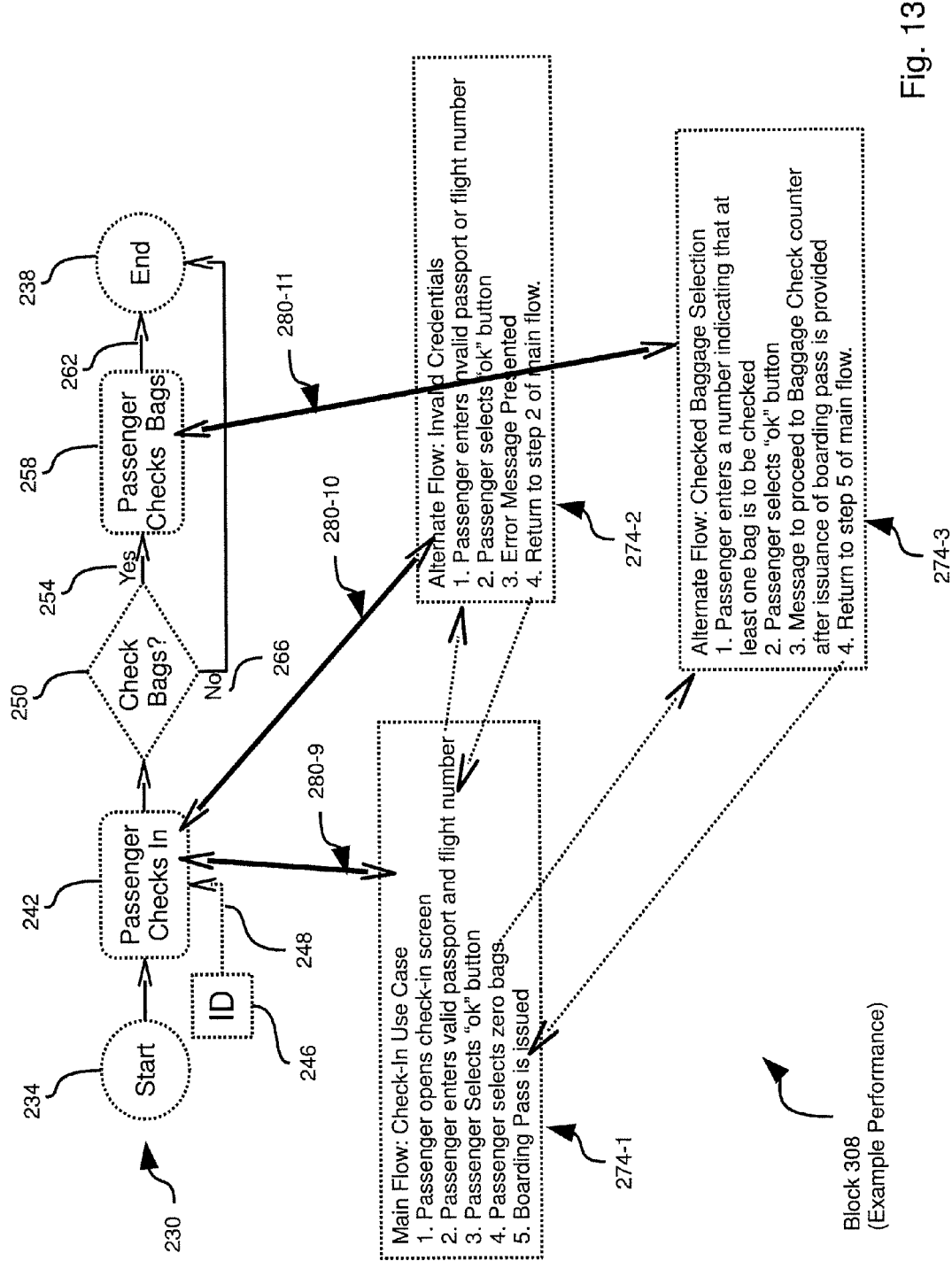
FIG. 13 shows an example of pointing relationships being established between the elements of the business process model of FIG. 5 and the use cases of FIG. 9.

FIG. 13 shows another graphical representation of additional pointing relationships that may be received at block 308 which build on the specific examples given above. In FIG. 13, pointing relationships between business process model 230 and use cases 274 are established. A pointing relationship 280-8 is therefore established between use case 274-1 and passenger check-in task element 242. A pointing relationship 280-10 is also established between use case 274-2 and passenger check-in task element 242. Another pointing relationship 280-11 is also established between use case 274-3 and passenger checks bags task element 258. While not shown for illustrative simplicity, those skilled in the art will now recognize that pointing relationships may also be provided between various flow connectors of business process model 230 and the existing linkages between various use cases 274.

The means by which input is provided at computing devices 50 to establish pointing relationships 280 is not particularly limited. Such input can be provided graphically in some fashion analogous to that shown in FIG. 11, FIG. 12 and FIG. 13, or such pointing relationships 280 may be provided in a more textual or tabular format. In any event, such pointing relationships 280 are received and maintained by integration engine 208.

The pointers discussed above can include metadata. Such metadata can include any one or combination of a directionality indicator, a pointer type indicator, and a suspect tag. A directionality indicator shows the causality of impact between the descriptors linked by the pointer. For example, when a pointer links a technical requirement descriptor "A" with a business rule descriptor "B" that the technical requirement fulfills, the pointer can include a directionality indicator "A-B", indicating that "A" effects "B". A pointer type indicator identifies the type of relationship between the linked descriptors. For example, if a pointer defines a relationship between a functional requirement descriptor and a test case descriptor which is employed to test the functional requirement, the pointer linking those descriptors may include a relationship type indicator that the relationship is a "tested by" relationship. A suspect tag can be used to mark one of the descriptors linked by a pointer, to cause simulation application 200 to generate an alert when the other descriptors linked by the pointer are selected for editing. Thus, the suspect tag can be used when a descriptor is edited in order to generate an alert drawing attention to the edit in connection with the other descriptor.

Referring again to FIG. 4, block 312 comprises integrating the various descriptors and pointers. While certain pointing relationships 280 are expressly provided, it will now be apparent that other pointing relationships can be automatically generated. For example, by virtue of the pointing relationships 280 established in FIG. 11 and FIG. 12 and FIG. 13, then the pointing relationships between picture-boards 270 and use cases 274 can also be automatically generated by integration engine 208 as part of block 312. (Alternatively, they can be automatically calculated by simulation engine 212 during a multi-aspect simulation as part of block 316). In some embodiments, it is contemplated that the performance of block 312 can be omitted. In such embodiments, the performance of method 300 includes the receipt of pointers at block 308, and proceeds directly to block 316. Additionally, in some embodiments, the performance of block 308 may omit the automatic generation of pointers, but may include the receipt of additional data associated with the pointers received at block 308 (such as the metadata described above).

The skilled reader will also now appreciate the scalability of the teachings, in that once all descriptors are received at block 304, and once one set of pointers is received at block 308 between various pairs of descriptors at block 308, then integration engine 208 can integrate the various descriptors and pointers. At this point of automatic integration at block 312, system 100 can effect a technological linkage between disparate descriptors.

Block 316 comprises creating a multi-aspect simulation based on the descriptors from block 304, the pointers from block 308 and the integration from block 312. In system 100, block 316 is technologically effected through simulation engine 212. Block 320 comprises generating the simulation created at block 316. Block 320 can also be effected via simulation engine 212 and through the control of a display 54 in response to input from input devices 74 to show the simulation created at block 316.

Figure 14:
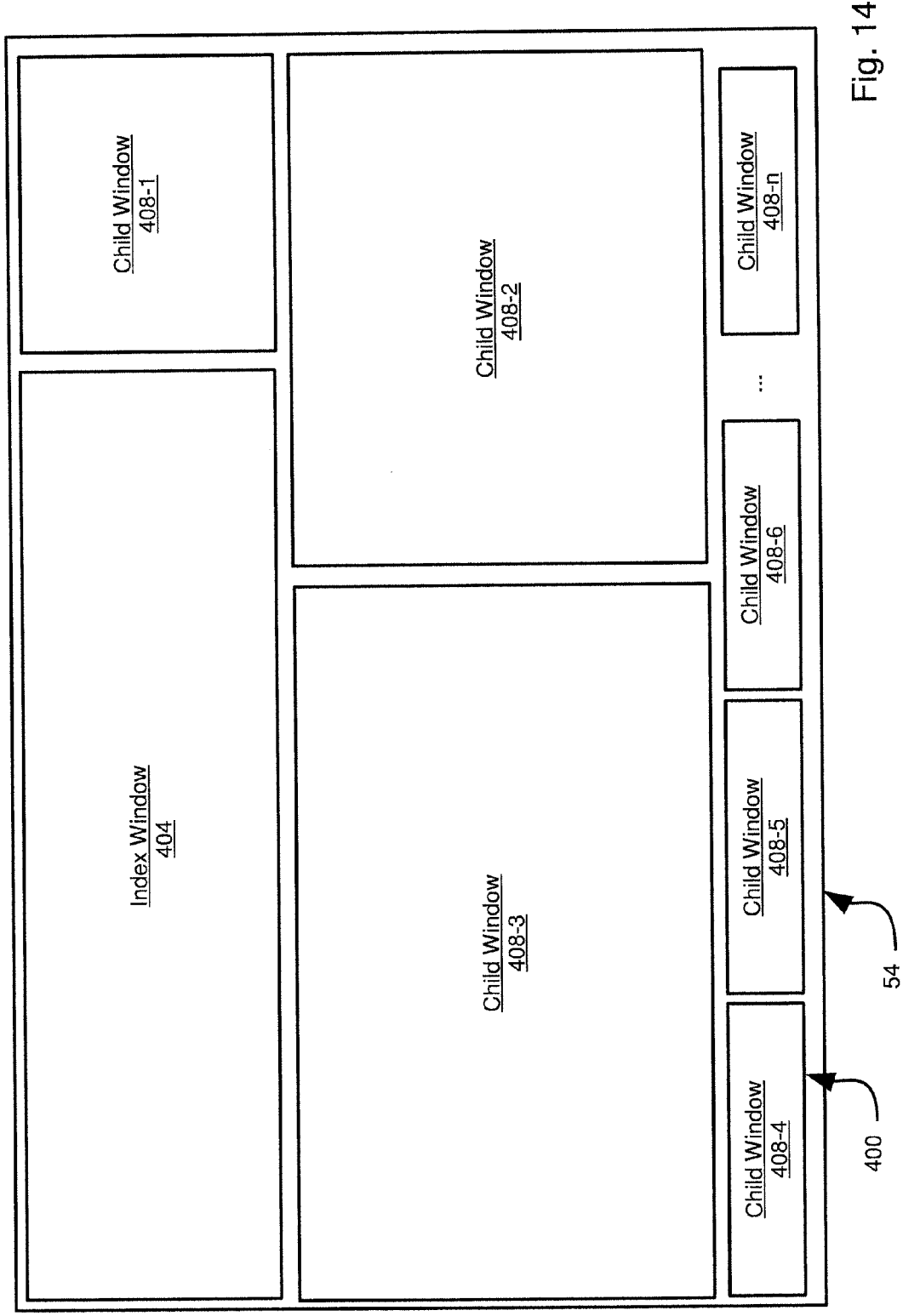
FIG. 14 shows an example of a screen layout that can be used in a simulation according to the method of FIG. 4.

Another advantage afforded by the present specification is that the nature and type of simulations that can be created at block 316, and generated at block 320, are virtually limitless. A non-limiting example of such a simulation, based on the examples above, is provided in FIG. 14 and thereafter. FIG. 14 shows a sample simulation layout 400 that can be generated on display 54 or the like.

Simulation layout 400 comprises a plurality of windows or frames. Simulation layout 400 contemplates an index window 404 and one or more child windows 408. Index window 404 is based on one of the descriptors received at block 304, while child windows 408 are based on one or more of the other descriptors received at block 304. The contents shown in a given child window 408 are determined by pointers expressly received at block 308 or automatically determined at block 312. A child window 408 can be provided for every descriptor, or alternatively other means can be used to make contents of a given child window 408 accessible. Such other means can comprise, for example, cascading of one or more child windows 408 rather than tiling as shown in FIG. 14. Such other means can also comprise the use of hyperlinks within a given index window 404 or a child window 408 which, when selected (for example, by single-clicking of a mouse), bring up a particular child window 408. Alternatively, the technique of pointer-hovering can be used, whereby if a mouse pointer is hovered over a particular portion of index window 404, or a given child window 408, then another child window may appear for the time the pointer is hovered over the particular portion. It is also contemplated that other functionality can be added whereby a given child window 408 may be selected and converted into the active index window 404, effectively swapping one child window 408 with the current active index window 404. It is contemplated that the ability to resize, tile or cascade any of index window 404 or child windows 408 can be provided within a simulation at block 320. It is also contemplated that a plurality of active index windows 404 may be simultaneously provided. Alternatively, it is contemplated that there can be a root index window 404 and then child index windows which govern the behaviour of other child windows. It is also contemplated that application 200 can be equipped with a design tool to provide flexibility in the appearance of a simulation layout 400 according to any of the foregoing or according to other usability or user interface design techniques.

Figure 15:
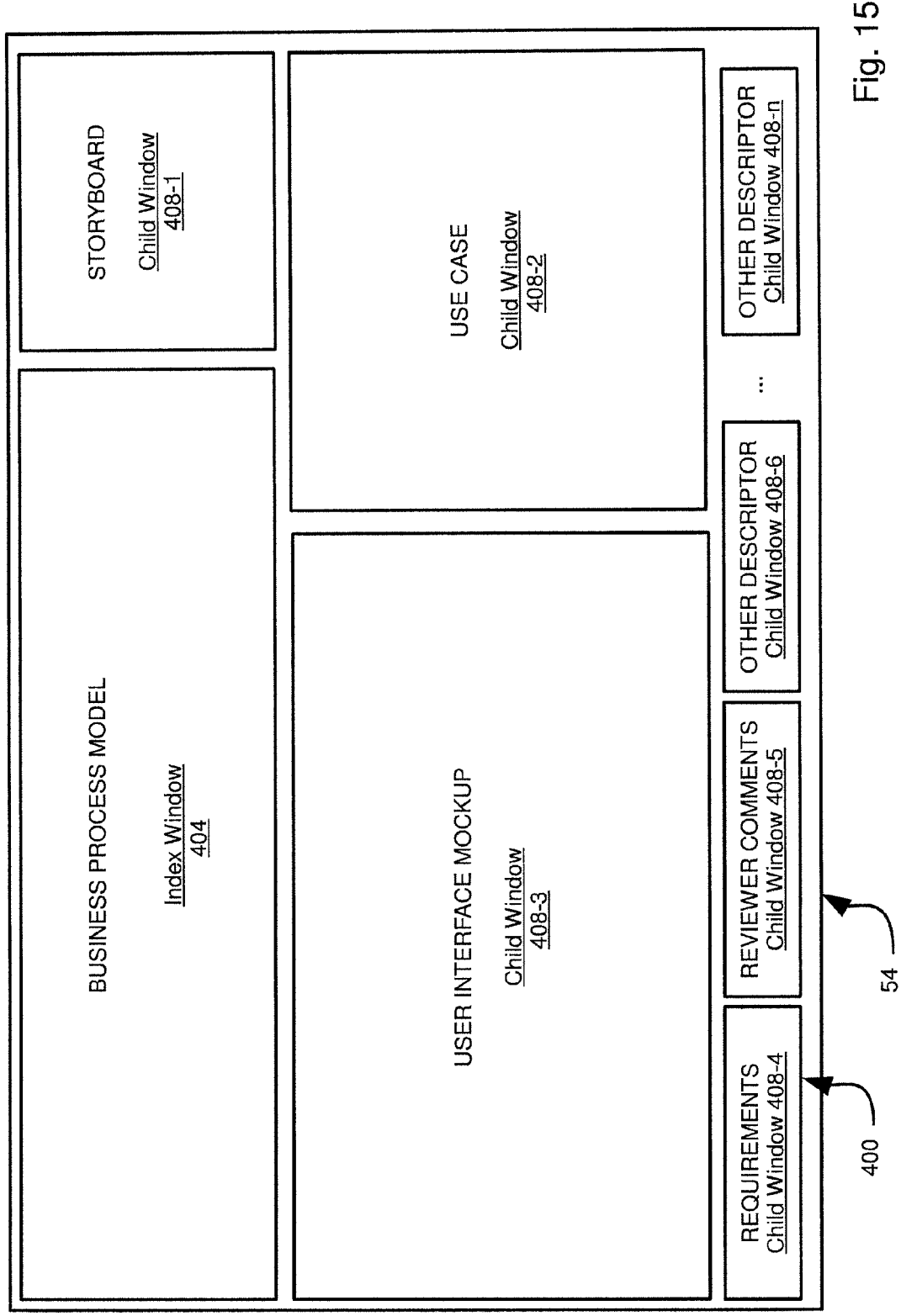
FIG. 15 shows a more specific example of a screen layout that can be used in a simulation according to the method of FIG. 4.

FIG. 15 shows a non-limiting example implementation of layout 400 as applied to the examples discussed above. In FIG. 15, business process model 230 would be used for the index window 404; a relevant picture-board 270 would be generated for the first child window 408-1 and a relevant use case 274 would be generated for child window 408-2. A relevant user interface mockup received at block 304 would be generated for child window 408-3. A relevant set of requirements received at block 304 would be generated for child window 408-4. A relevant set of reviewer comments (such as requirements desired by the reviewer) received at block 304 would be generated for child window 408-5. Other descriptors received at block 304 can be used for the remaining child windows 408.

Figure 16:
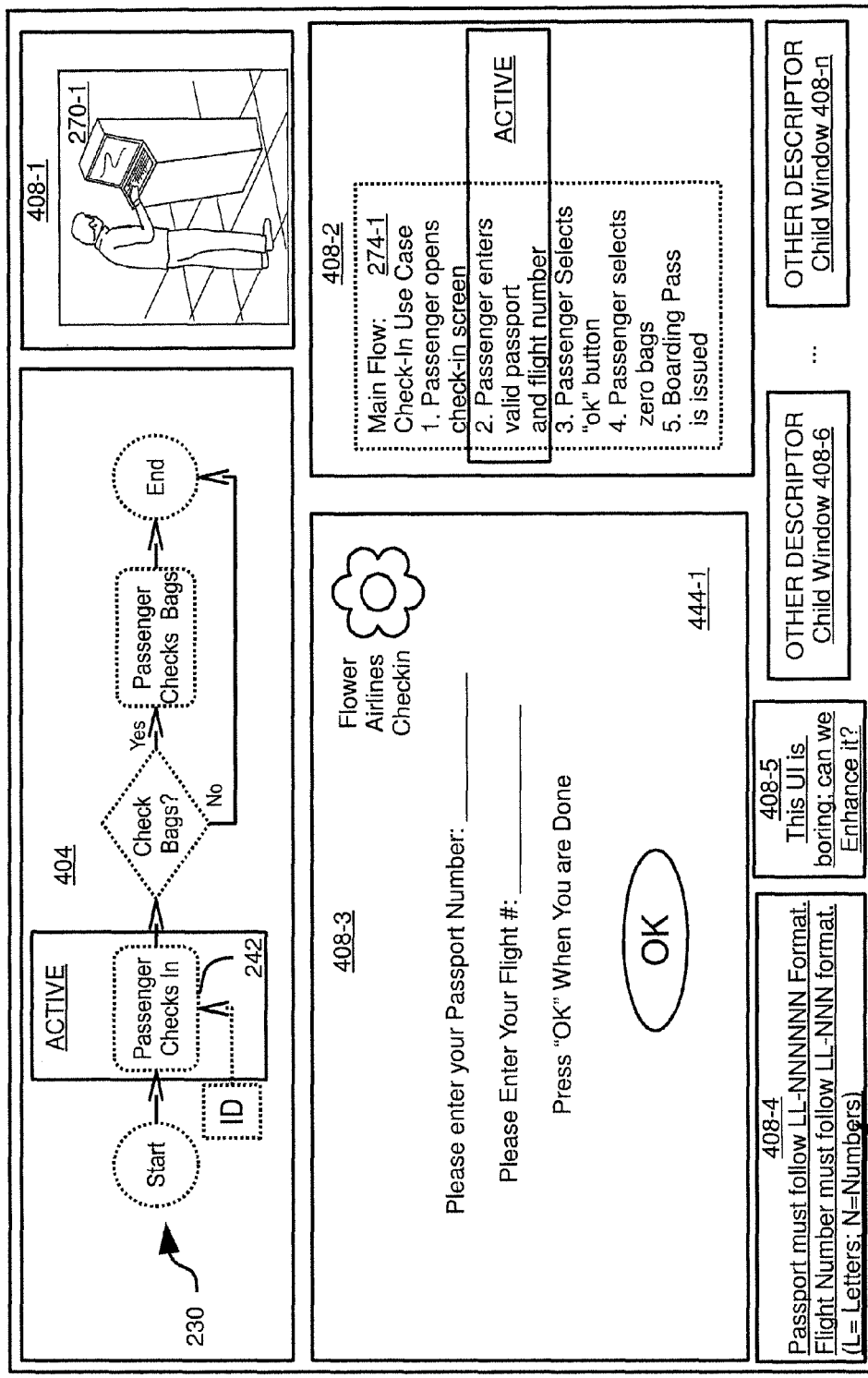
FIG. 16 shows another specific example of a screen layout that can be used in a simulation according to the method of FIG. 4.

FIG. 16 shows a specific rendering on display 54 that can occur using the example from FIG. 15 and based on the specific examples in FIG. 5 through FIG. 13. In FIG. 16, passenger checks-in task element 242 is labeled as "Active" in index window 404. A pointing device can be used to change which element in business process model 230 is active. Accordingly, picture-board 270-1, which is linked from element 258 (as discussed above) is shown in window 408-1. Also, use case 274-1, which is which is linked from element 258 (as discussed above) is shown in child window 408-2. In this example, child window 408-2 is also a child-index window, in that various user interface mockups received at block 304 are associated with different steps in use case 274-1. (Note that specific user interface mock up examples have not been previously given, but are now assumed to have been received at block 304 and an example of which is now shown in FIG. 16.) Accordingly, step two of use case 274-1 is labeled "Active" in child window 408-2, and a corresponding user interface mockup 444-1 (prompting a passenger to provide a passport number and a flight number) is shown in child window 408-3.

To further the example in FIG. 16, child window 408-4 shows requirements that relate to step two of use case 274-1, which indicates that the passport number and flight number must be of a particular format. Child window 408-5 shows a comment that has been made, which in this specific example the comment notes that the user interface mockup is "boring" and querying whether it can be "enhanced". Note that application 200 can be configured so that the contents of comment window can be edited directly from simulation layout 400; and accordingly it will now be apparent that the entirety of simulation layout 400 can also have editing functionality if desired so that layout 400 can also be used to provide input for block 304 or block 308.

FIG. 16 also contemplates that other child windows 408 can also be populated with various related descriptors if desired.

Figure 17:
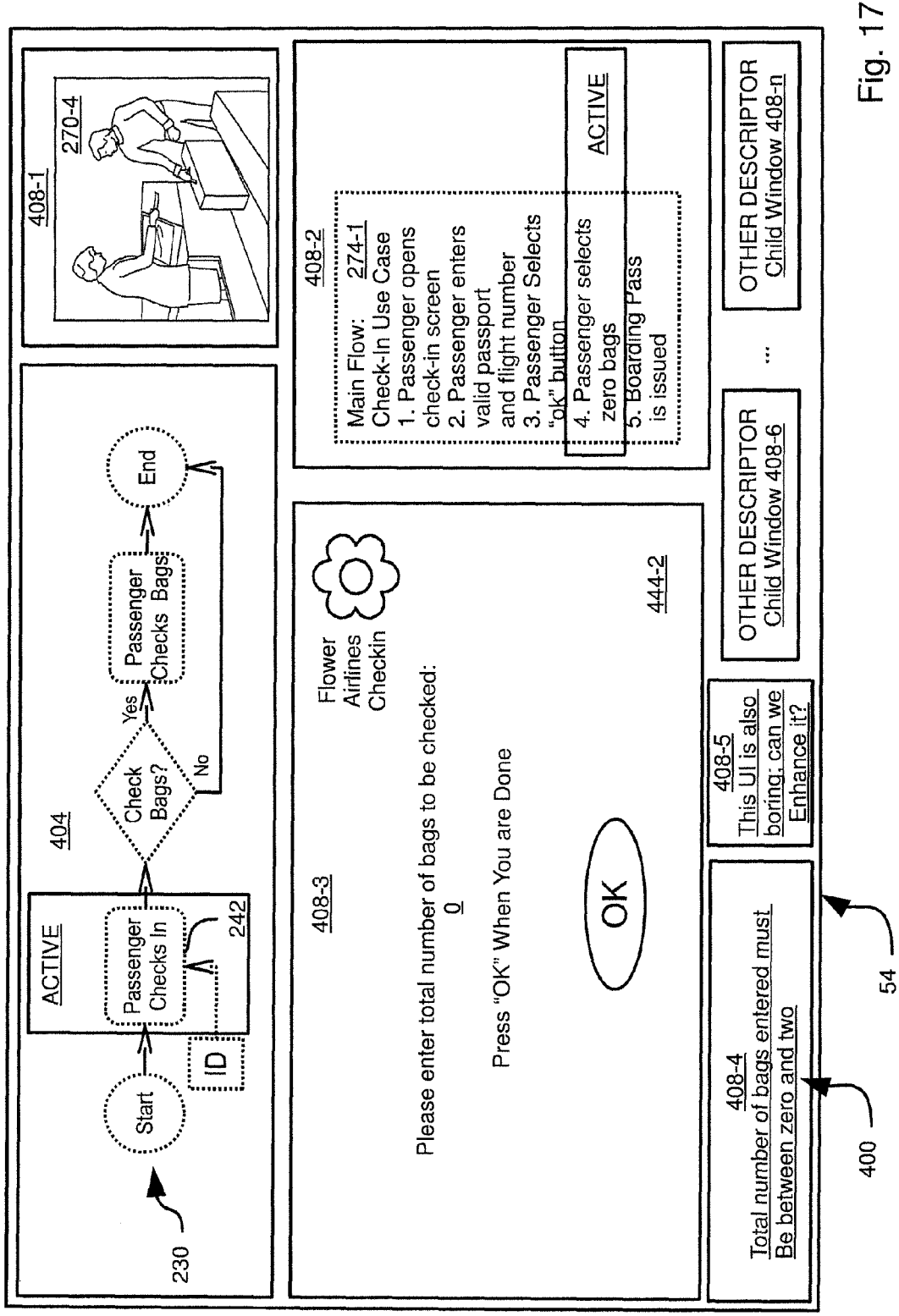
FIG. 17 shows another specific example of a screen layout that follows from the specific layout of FIG. 16.

FIG. 17 shows a specific rendering on display 54 that can follow from the rendering in FIG. 16. In FIG. 17, the Active step in use case 274-1 has been advanced to step four "Passenger selects zero bags", and accordingly, child window 408-3 has been updated to show the corresponding user interface mockup 444-2.

Figure 18:
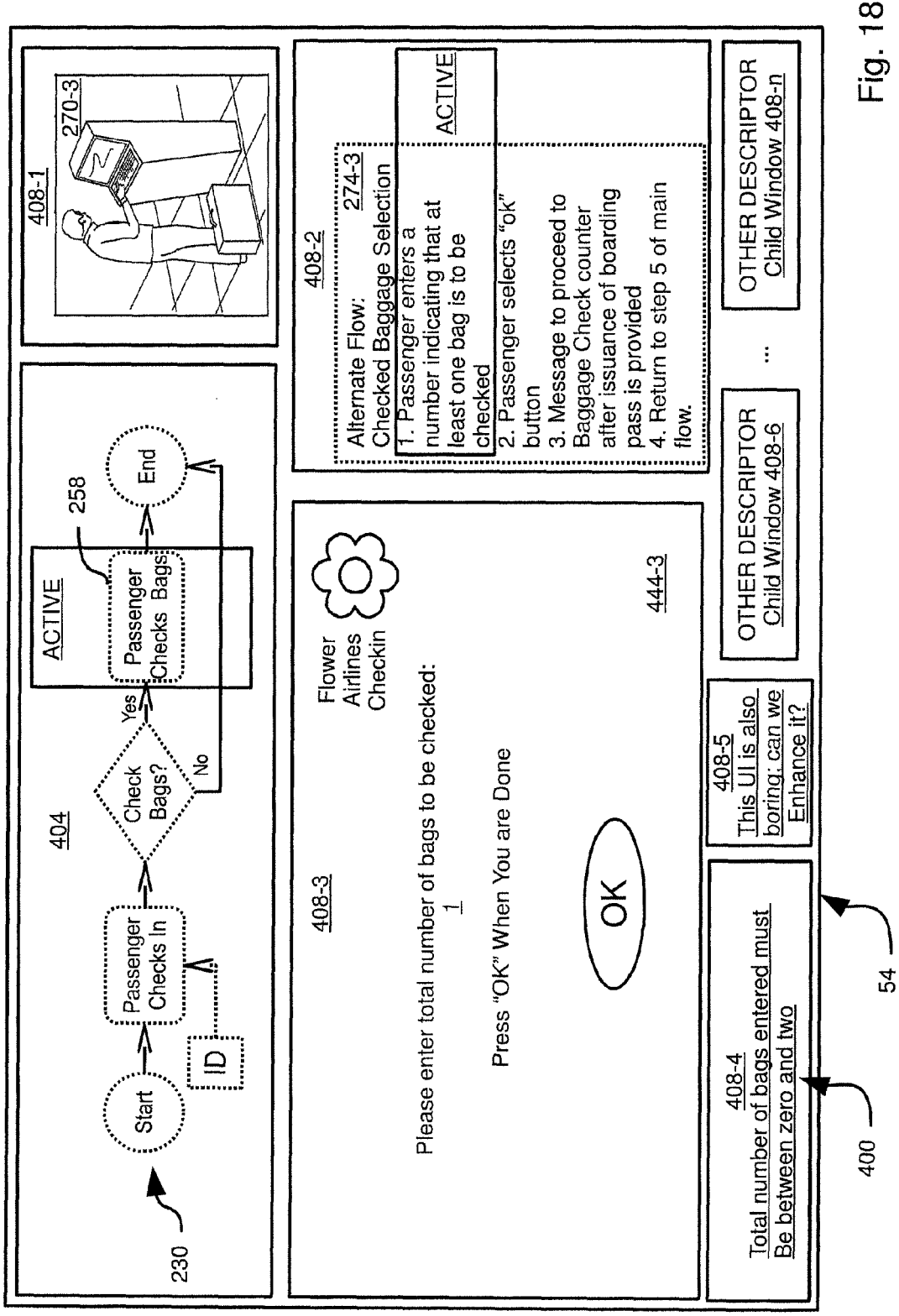
FIG. 18 shows another specific example of a screen layout that can be used in a simulation according to the method of FIG. 4.

FIG. 18 shows another example specific rendering on display 54 that corresponds to an example where the passenger has baggage to check. In this example, the passenger checks bags task element 258 is active in window 404, and accordingly picture-board 270-3 is active in window 408-1. Likewise use case 274-3 is active in window 408-2, and a corresponding user interface mockup 444-3 is active in window 408-3 and a corresponding requirement is active in window 408-4.

While not shown, it is contemplated that the simulation(s) generated at block 320 may be interrupted at any time in order to edit or provide new descriptors at block 304 or to edit or provide new pointers at block 308, and then to rapidly generate the simulation again at block 320 based on changes made at block 304 or block 308 or both. Any or all of the participants that provided the descriptors or the pointers may participate in the simulation and change process so that collaboratively a functional specification can be agreed upon across a wide variety of different groups having different skills, talents and goals. In this manner, once a satisfactory simulation has been effected, the descriptors from block 304, and the pointers from block 308, and the integration from block 312 can be exported into a highly disciplined and structured functional specification that can then be used to build the system described by the final set of descriptors from block 304 and the pointers from block 308.

Figure 19:
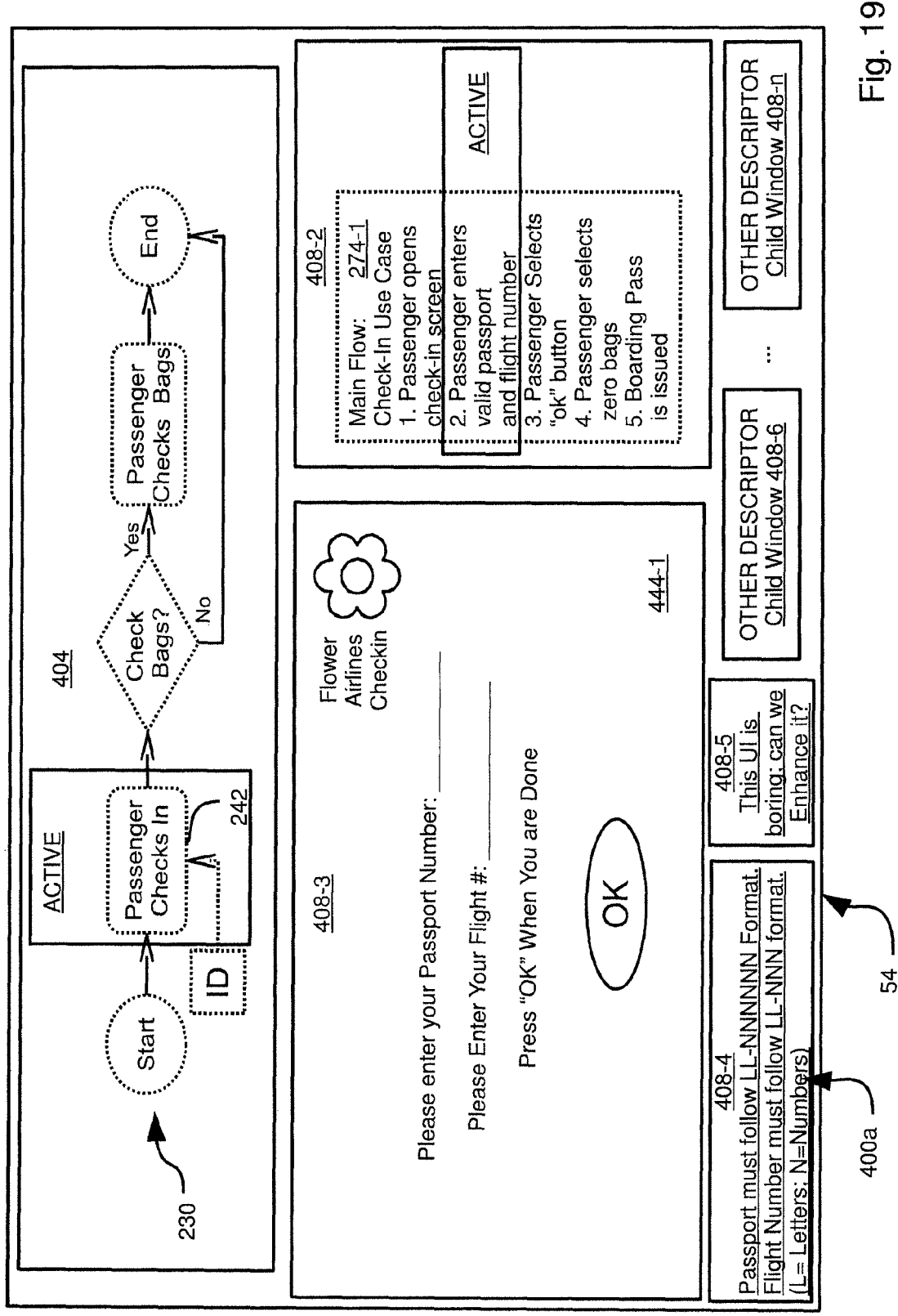
FIG. 19 shows a variation of the example screen layout of FIG. 16.
Figure 20:
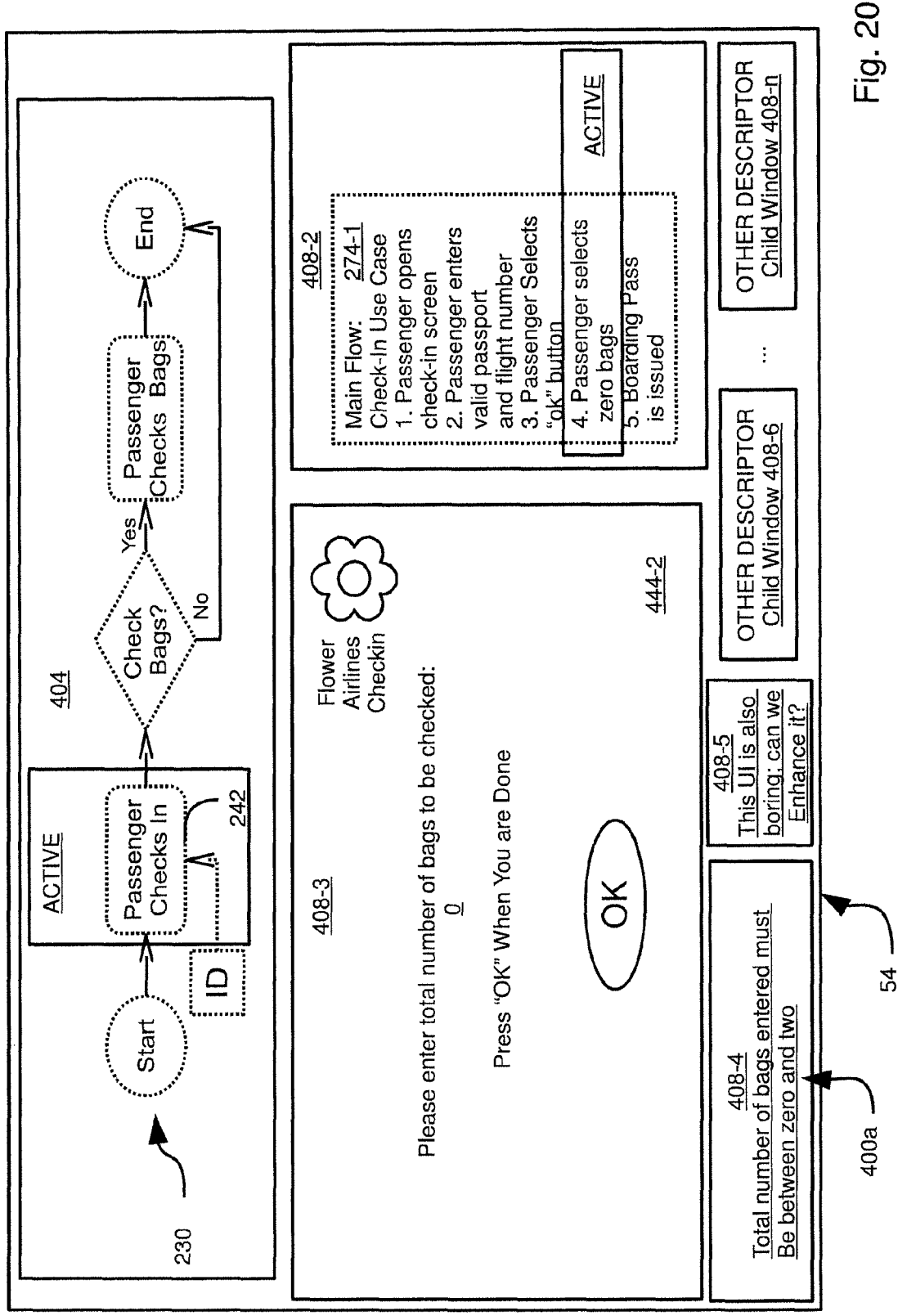
FIG. 20 shows a variation of the example screen layout of FIG. 17.
Figure 21:
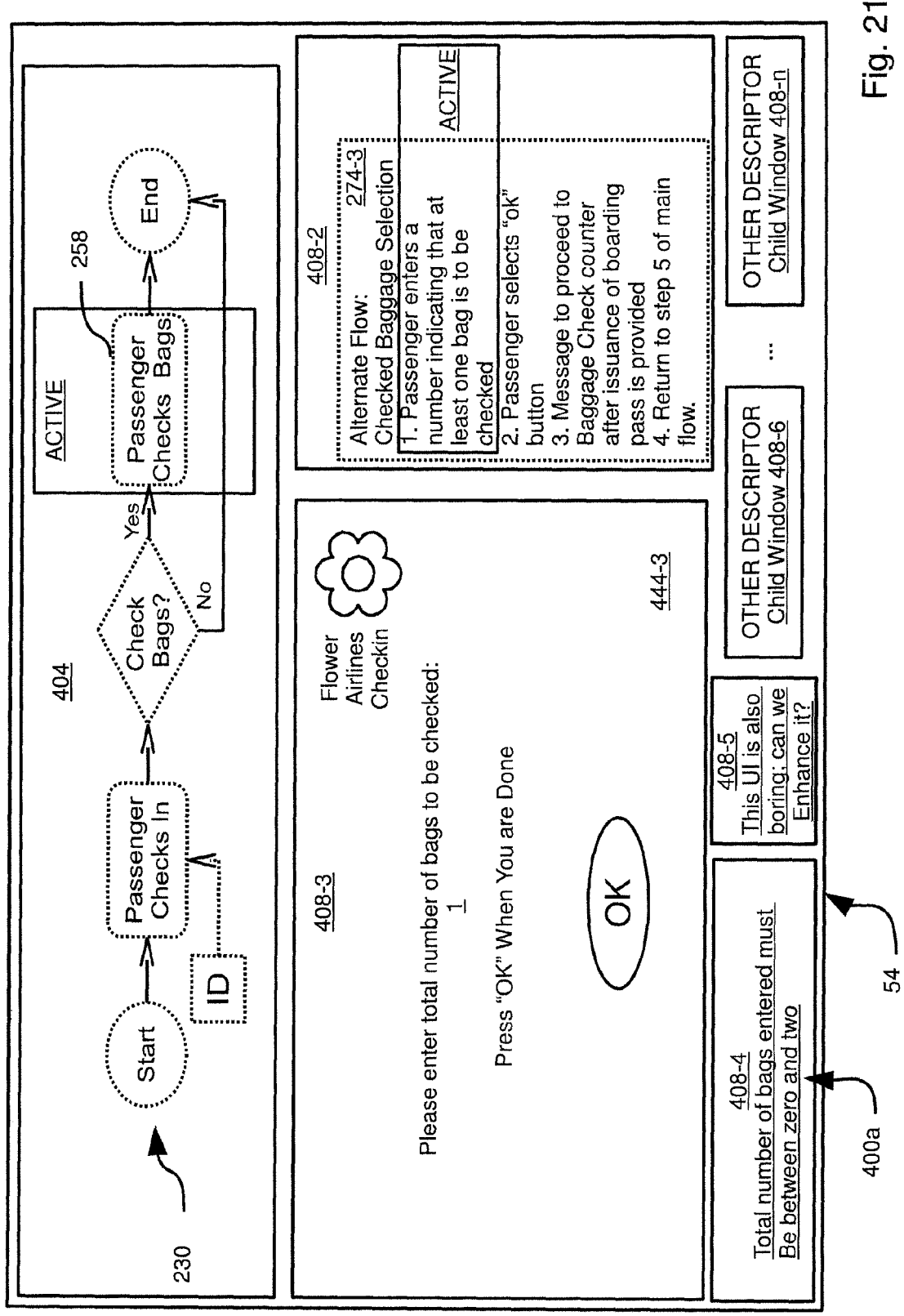
FIG. 21 shows a variation of the example screen layout of FIG. 18.

Variations are contemplated. For example, fewer, additional, or alternative descriptors than those discussed above are contemplated. As a specific example, it is contemplated that picture-boards may be omitted as a descriptor altogether, so that picture-boards are omitted from method 300 altogether. The net result of this omission is shown in FIG. 19, FIG. 20 and FIG. 21 which show a simulation layout 400a. Simulation layout 400a is substantially the same as simulation layout 400, except that child window 408-1 is omitted. FIG. 19 is thus a variation on FIG. 16, except that child window 408-1 is omitted in FIG. 19; FIG. 20 is thus a variation on FIG. 17, except that child window 408-1 is omitted in FIG. 20; and FIG. 21 is thus a variation on FIG. 18, except that child window 408-1 is omitted in FIG. 21.

Figure 22:
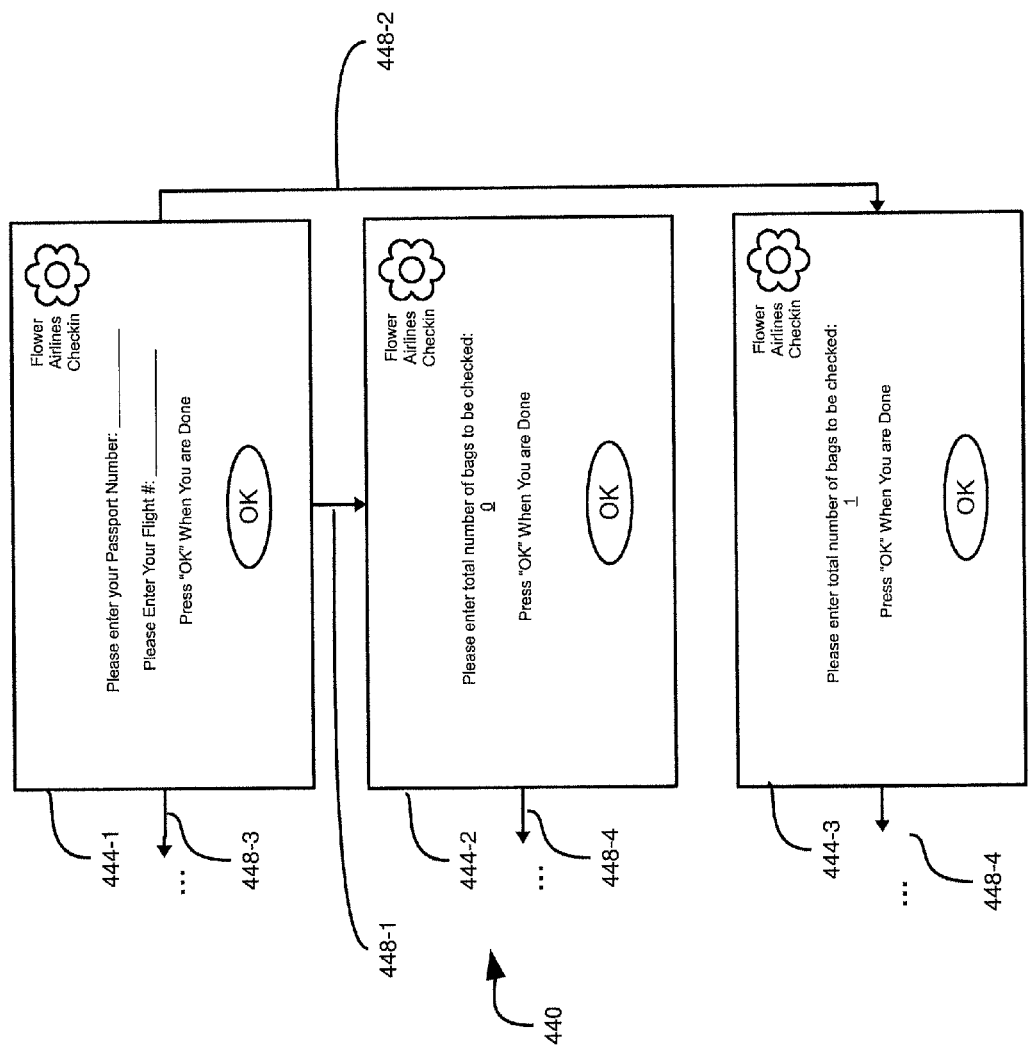
FIG. 22 shows an example storyboard that can be received via one of the computing devices of FIG. 2.

As another variation storyboard interface 204-14 (not shown) is configured to receive storyboard data, which as noted above can include UI mockups as well as other images and text. A very simplified example of storyboard data is shown in FIG. 22, in the form of storyboard 440. Such storyboard data represents a user interface mockup sequence, and can be used as an alternative or supplement to use cases 274. Such a sequence of user interface mockups can thus be assembled into a storyboard that represents substantially the same data as a use case 274. However, such a storyboard can describe the use case without the need for expressly identifying technical requirements, thereby permitting non-technically trained participants in the software design process. The specific formats for receiving such data are not particularly limited, but can comprise first receiving user interface mockups via user interface mockup interface 204-6, and then receiving a set of sequencing connectors indicating an ordering or sequencing of those user interface mockups. According to the example in FIG. 22, three specific exemplary user interface mockups 444 are provided, which are connected via connectors 448. Additional connectors 448 are shown that point to ellipsis, which denote the fact that other user interface mockups which are not shown are contemplated to be part of storyboard 440. The reader will appreciate that the example user interface mockup 444-1 corresponds to the example shown in FIG. 16 and FIG. 19; user interface mockup 444-2 corresponds to the example shown in FIG. 17 and FIG. 20; and user interface mockup 444-3 corresponds to the example shown in FIG. 18 and FIG. 21. A complete storyboard 440 can be developed to represent the same information in use cases 274, but in the storyboard format. Storyboard 440 can be received at block 304 of method 300 and then pointers associated therewith to at block 308 of method 300 according to suitably modified versions of the specific examples discussed above. Simulation layout 400 can likewise be modified to provide a child window 408 for storyboard 440. Typically, simulation layout 400 can be modified to omit inclusion of use cases 274 in child window 408-2, and instead to display storyboard 440 in its place, with an "ACTIVE" indicator, or the like, being used to correspond with the specific user interface mockup 444 being shown in child window 408-3.

It is also contemplated that the performance of block 320 can comprise generating a merged flow from the descriptors received at block 304, based on the relationships identified at blocks 308 and 312. The merged flow can thus include a plurality, or even all, the descriptors received at block 304 (including, for example, multiple use cases), and can be represented in an index window 404 as discussed above.

In further examples, the performance of block 320 can include the storage of a log, or history, identifying which descriptors have been selected (or "live") in the index window 404. The simulation application 200 can thus be configured to generate a representation on a display of the history, identifying which flows have been visited (i.e. selected during the performance of block 320) and which have not.

Figure 23:
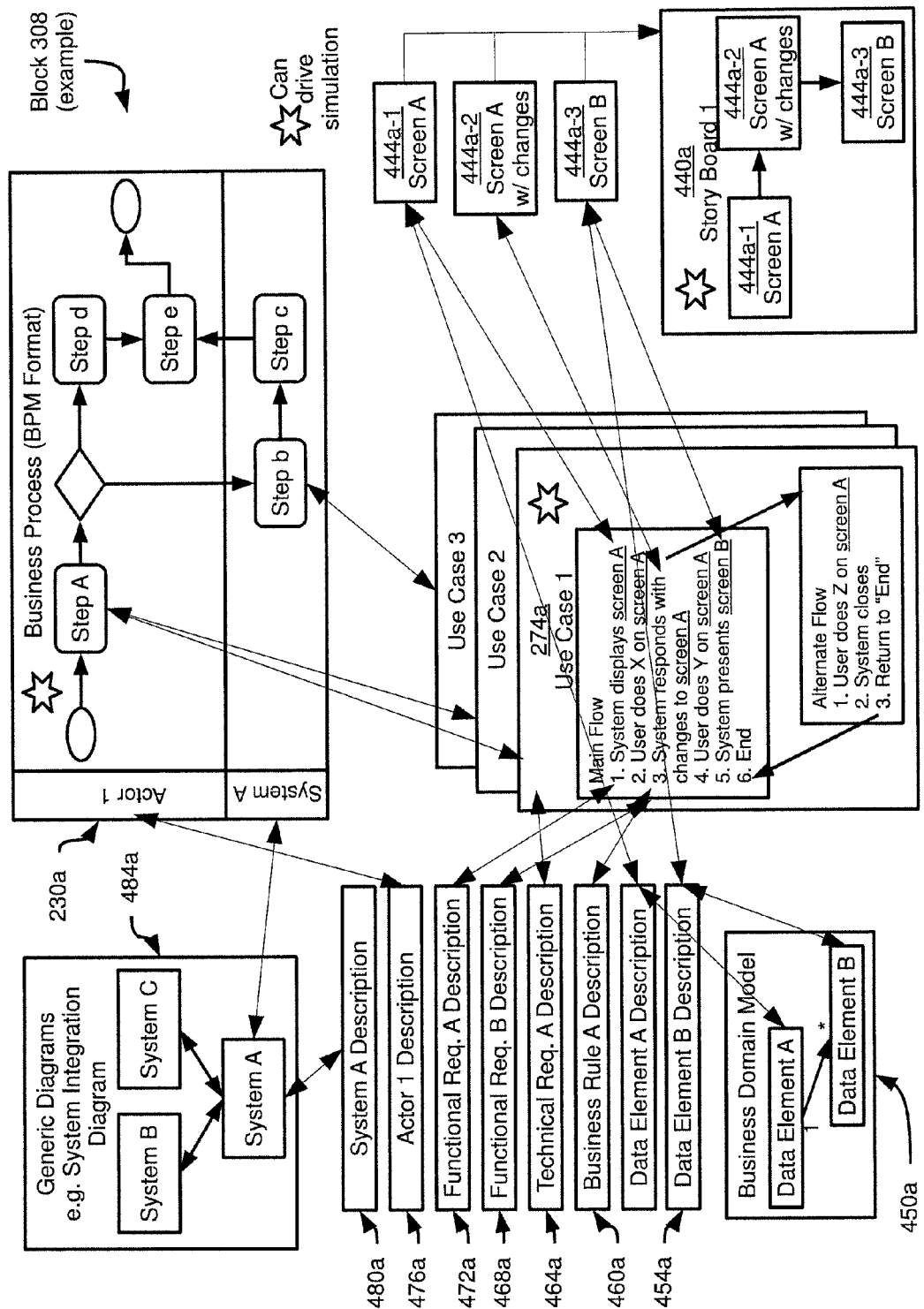
FIG. 23 shows another example of various integrated descriptors and pointers that can be used to create and generate a simulation according to the method of FIG. 4.

It is again to be reemphasized that notwithstanding the specific examples provided in the foregoing, the present specification contemplates more generally multi-aspect simulation comprising at least one of said set of descriptors describing a business process without reference to technical requirements and at least another one of the sets of descriptors referring to technical requirements. FIG. 23 illustrates this point, as FIG. 23 includes another example of various integrated descriptors and pointing relationships that can be used to create and generate a simulation according to the method of FIG. 4. FIG. 23 is provided in a format that is analogous to the format of FIG. 11, FIG. 12 and FIG. 13, except that FIG. 23 includes a more complete set of descriptors and pointers, whereas FIG. 11, FIG. 12 and FIG. 13 each only show a sub-set of descriptors and pointing relationships. Thus FIG. 23 represents another example performance of block 308 of method 300, where the reception (at block 304) of the various descriptors shown in FIG. 23 is assumed to have already occurred.

To illustrate the fact that the example in FIG. 23 is a variation, references in FIG. 23 include the suffix "a", but otherwise like elements bear like references to the counterparts in earlier examples. Thus, more specifically, the example in FIG. 23 contemplates a business process 230a which is slightly more complex than business process 230. Business process 230a contemplates two swim-lanes, one belonging to a first actor "1" that is identified in actor descriptors 476a, and a second swim lane belonging to a first system "A" that is identified in system descriptors 480a and identified in greater detail in system descriptor diagrams 484a. Various pointing relationships are provided between actor descriptors 476a and business process 230a, and between system descriptor diagrams 484a and business process 230a.

The example in FIG. 23 also contemplates use cases 274a which have various pointing relationships with business process 230a. Similarly use cases 274a have various pointing relationships with different user interface mockups 444a. A storyboard 440a is also provided that utilizes and sequences different user interface mockups 444a to represent the use cases 274a.

The example in FIG. 23 also contemplates other descriptors including business domain model 450a, data elements 454a, business rules 460a, technical requirements 464a, functional requirements 468a and functional requirements 476a, all of which have defined pointing relationships to the use cases 274a.

It will now be appreciated that the data in FIG. 23 can be used to generate and drive simulations of the type contemplated in FIG. 19, FIG. 20 and FIG. 21, although recognizing that the particular screen layouts and the graphical interfaces therewith are not particularly limited.

It is to be understood that variations, sub-sets and combinations of the foregoing are contemplated, and that the scope of the exclusive privilege of this specification is defined by the claims.

The invention claimed is:

1. A method for multi-aspect simulation for generation of a software programming specification for a proposed article of software, comprising:
    receiving at a processor via at least one input device a plurality of sets of descriptors; each descriptor identifying different aspects of a software programming specification; each set of descriptors having its own format; each descriptor in each said set being sequenced; at least one of said sets of descriptors describing a business process without reference to technical requirements and at least another one of said sets of descriptors referring to technical requirements;
    receiving at said processor via said at least one input device a plurality of pointers identifying relationships between descriptors from within at least two different sets of said descriptors;
    creating a simulation of said software at said processor and presenting said simulation on a display connected to said processor; said simulation comprising at least one index window and at least one child window; said index window for showing one of said sets of descriptors;
    receiving, at said processor, a selection of one of said descriptors in said index window, and marking said selected descriptor as a live descriptor;
    in response to receiving said selection updating, at said processor, said at least one child window to contain at least one related descriptor from another one of said sets; said related descriptor being selected for presentation in said child window by said processor based on one of said relationships associated with said live descriptor and indicating a relationship between said live descriptor and said related descriptor.

2. The method of claim 1 further comprising, prior to said creating, inferring further relationships between different descriptors based on said pointers.

3. The method of claim 1 wherein at least a portion of said business process descriptors are based on a business process model.

4. The method of claim 3 wherein said business process model is based on one of Business Process Modeling Notation or Unified Modeling Language.

5. The method of claim 1 wherein said business process descriptors comprise storyboards.

6. The method of claim 1 wherein said business process descriptors further comprise business domain information.

7. The method of claim 1 wherein said business process descriptors further comprise business rules.

8. The method of claim 1 wherein said technical requirement descriptors comprise at least one of use cases, functional requirements, data, user interface mockups, technical requirements, actors, data operations, documents and reviewer comments.

9. The method of claim 1 wherein said simulation is generated on a display interconnected with said processor.

10. The method claim 9 wherein said one or more of said windows are tiled or cascaded on said display.

11. The method of claim 9 wherein hyperlinks within a given window for one set of descriptors can be selected to open a child window of another set of descriptors.

12. The method of claim 9 wherein hovering a mouse pointer or single clicking over a particular portion of a window results in an invocation of a child window while that mouse pointer remains hovering.

13. The method of claim 9 wherein a given index window may be swapped with a given child window to reverse the role of which window is the index window.

14. The method of claim 9 wherein each window can be resized, tiled or cascaded.

15. The method of claim 1 wherein said index window is a root index and one of said child windows is a child index.

16. The method of claim 1, wherein generating said simulation comprises generating a merged flow from at least some of said received descriptors.

17. The method of claim 1, further comprising:
repeating at least one of the receipt of descriptors and the receipt of pointers;
updating the simulation in response to said repeating; and
exporting finalized descriptors and pointers.

18. A computing device, comprising:
at least one input device; and
a processor interconnected with said at least one input device, said processor configured to perform all of the steps of the method of claim 1.

19. A non-transitory computer readable medium storing a plurality of computer readable instructions executable by a processor for performing all of the steps in the method of claim 1.

* * * * *